(12) United States Patent
Wighton et al.

(10) Patent No.: US 9,183,325 B2
(45) Date of Patent: Nov. 10, 2015

(54) ADDITIVE FABRICATION SUPPORT STRUCTURES

(71) Applicant: Formlabs, Inc., Somerville, MA (US)

(72) Inventors: Shane Wighton, Cambridge, MA (US); Maxim Lobovsky, Cambridge, MA (US); Matthew Keeter, Cambridge, MA (US); Akimitsu Hogge, Cambridge, MA (US)

(73) Assignee: Formlabs, Inc., Somerville, MA (US)

( * ) Notice: Subject to any disclaimer, the term of this patent is extended or adjusted under 35 U.S.C. 154(b) by 0 days.

(21) Appl. No.: 14/275,459

(22) Filed: May 12, 2014

(65) Prior Publication Data

US 2014/0300017 A1   Oct. 9, 2014

Related U.S. Application Data

(63) Continuation of application No. 14/245,765, filed on Apr. 4, 2014.

(60) Provisional application No. 61/878,851, filed on Sep. 17, 2013, provisional application No. 61/808,714, filed on Apr. 5, 2013.

(51) Int. Cl.
*B29C 67/00* (2006.01)
*G06F 17/50* (2006.01)
*B33Y 50/00* (2015.01)

(52) U.S. Cl.
CPC ............ *G06F 17/50* (2013.01); *B29C 67/0092* (2013.01); *B33Y 50/00* (2014.12)

(58) Field of Classification Search
CPC .................................................. B29C 67/0092
See application file for complete search history.

(56) References Cited

U.S. PATENT DOCUMENTS

| 4,999,143 | A | | 3/1991 | Hull et al. |
| 5,104,592 | A | * | 4/1992 | Hull et al. ..................... 264/401 |
| 5,454,069 | A | * | 9/1995 | Knapp et al. .................. 345/420 |
| 5,503,785 | A | | 4/1996 | Crump et al. |
| 5,595,703 | A | | 1/1997 | Swaelens et al. |
| 6,193,923 | B1 | | 2/2001 | Leyden et al. |

(Continued)

FOREIGN PATENT DOCUMENTS

EP    0338751 B1   3/1996

OTHER PUBLICATIONS

The Standard Coffee Mug Dimensions. ampli.fi blog [online]. Jan. 6, 2013 (edited Aug. 26, 2014) [retrieved on Apr. 16, 2015]. Retrieved from the Internet: <URL: http://blog.ampli.fi/the-standard-coffee-mug-dimensions>.*

*Primary Examiner* — Christina Johnson
*Assistant Examiner* — David Schmerfeld
(74) *Attorney, Agent, or Firm* — Wolf, Greenfield & Sacks, P.C.

(57) ABSTRACT

Some aspects provide a method of generating a support structure for an object, the support structure and the object to be fabricated via one or more additive fabrication techniques, comprising identifying one or more regions of the object as one or more regions to which mechanical support is to be provided, identifying one or more support points within at least a first region of the one or more regions, and generating the support structure for the object, the support structure comprising one or more support tips coupled to the object at the one or more support points, the support tips being generated based at least in part on a direction normal to the surface of the object at the respective support point.

23 Claims, 18 Drawing Sheets

(56) References Cited

U.S. PATENT DOCUMENTS

| | | |
|---|---|---|
| 6,508,971 B2 | 1/2003 | Leyden et al. |
| 6,660,209 B2 | 12/2003 | Leyden et al. |
| 6,797,351 B2 | 9/2004 | Kulkarni et al. |
| 7,077,638 B2 | 7/2006 | Leyden et al. |
| 8,046,097 B2 * | 10/2011 | Hull et al. ............ 700/119 |
| 8,155,775 B2 | 4/2012 | Batchelder |
| 8,285,411 B2 | 10/2012 | Hull et al. |
| 8,470,231 B1 | 6/2013 | Dikovsky et al. |
| 8,903,533 B2 * | 12/2014 | Eggers et al. ............ 700/119 |
| 2015/0066178 A1 * | 3/2015 | Stava ............ 700/98 |

* cited by examiner

500
502
Identify Regions to which Support is to be Provided
504
Identify Support Points within at least one Region
506
Generate Support Structure Using Normals to Surface at Support Points
FIG. 5A

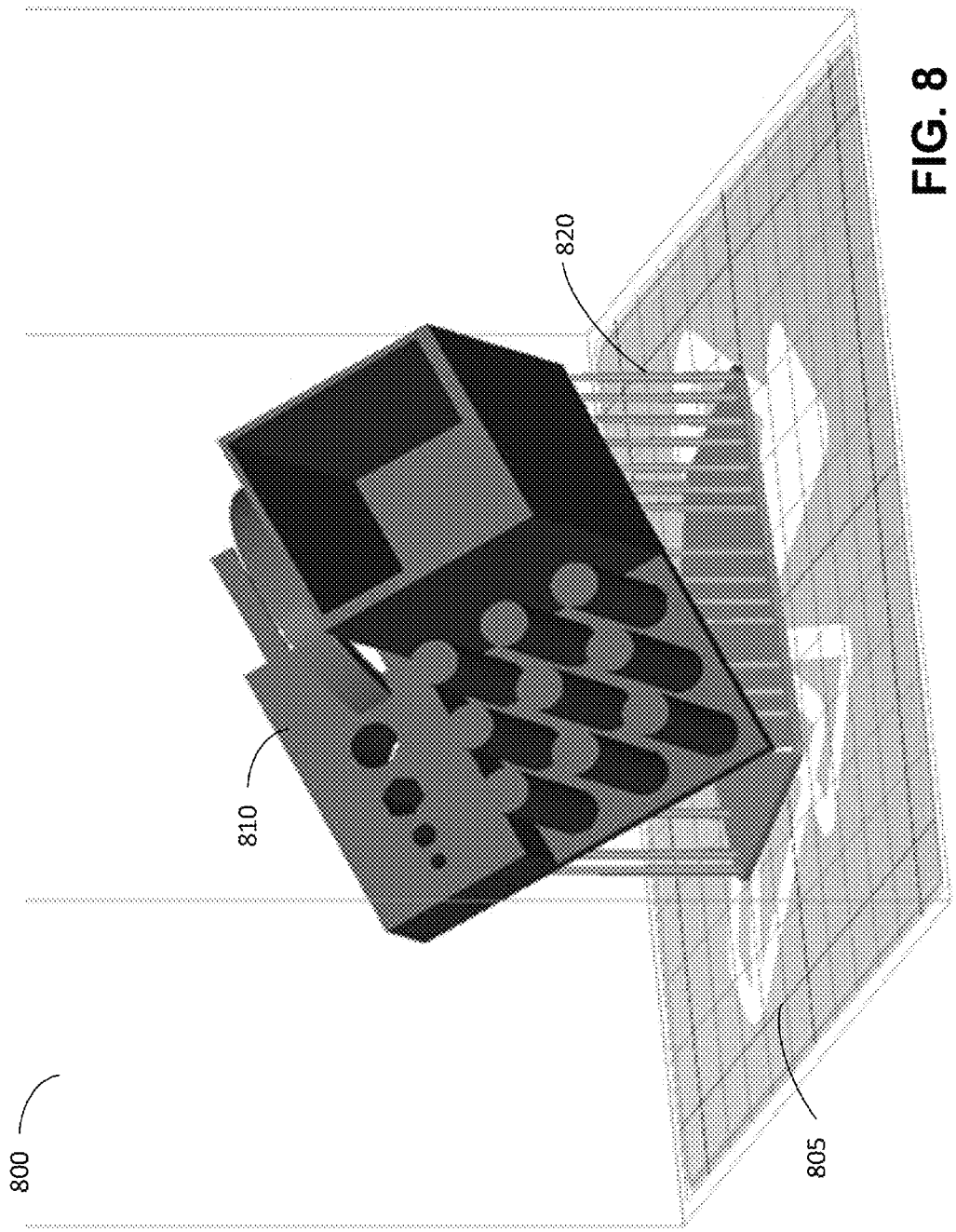

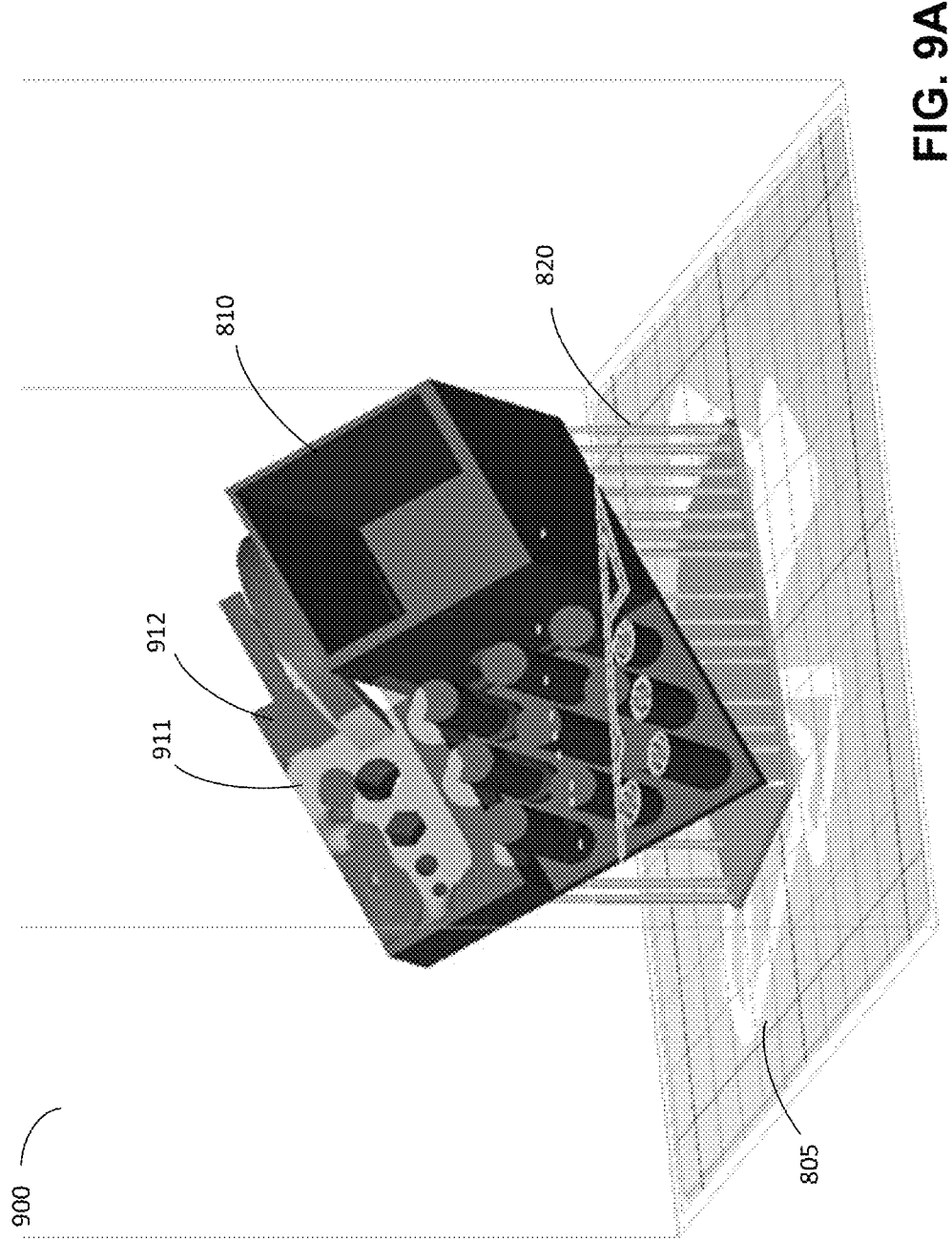

1000

1001
Obtain representation of support structure providing support to object

▼

1002
Calculate supportedness for a first region of the object

▼

1003
Depict support structure and/or object via GUI

▼

1004
Indicate supportedness of first region by coloring portion of the GUI

FIG. 10A

ADDITIVE FABRICATION SUPPORT STRUCTURES

CROSS-REFERENCE TO RELATED APPLICATIONS

This application claims the benefit as a continuation under 35 U.S.C. §120 of U.S. patent application Ser. No. 14/245,765, filed Apr. 4, 2014 and entitled "Additive Fabrication Support Structures," which claims the benefit of both U.S. Provisional Patent Application No. 61/808,714, filed Apr. 5, 2013, titled "Three-Dimensional Printing With Customizable Support Structures," and U.S. Provisional Patent Application No. 61/878,851, filed Sep. 17, 2013, titled "Support Structures for 3D Objects Formed in Layers," each of which are hereby incorporated by reference in their entirety.

FIELD OF INVENTION

The present invention relates generally to systems and methods for providing and evaluating support structures, including support structures that are suitable for use in additive fabrication.

BACKGROUND

Additive fabrication, e.g., 3-dimensional (3D) printing, provides techniques for fabricating objects, typically by causing portions of a building material to solidify at specific locations. Additive fabrication techniques may include stereolithography, selective or fused deposition modeling, direct composite manufacturing, laminated object manufacturing, selective phase area deposition, multi-phase jet solidification, ballistic particle manufacturing, particle deposition, laser sintering or combinations thereof. Many additive fabrication techniques build parts by forming successive layers, which are typically cross-sections of the desired object. Typically each layer is formed such that it adheres to either a previously formed layer or a substrate upon which the object is built.

When producing certain objects by additive fabrication, a support structure may be fabricated to provide mechanical support to the object being fabricated. An object may contain regions that are not fully supported by previously formed layers, and in such instances there may be no suitable working surface during fabrication that can provide support to those regions. By fabricating a support structure along with the primary object, a working surface can be provided to non-fully supported regions of the object during fabrication. Following the completion of the 3D printing process, the support structure is removed from the object through various post-processing steps.

In many cases, however, support structures can lead to surface deformations or other flaws in the object being fabricated, such as flaws caused by the attachment to the object and/or by the removal of the support structures from the object. The removal process in particular can damage the object in numerous ways, including by leaving part of the support structure behind, removing part of the object with the support structure, damaging the object, or otherwise marring the surface finish of the object. These flaws can be particularly apparent when support structures are fabricated using the same material as the desired object.

SUMMARY

Systems and methods for providing and evaluating support structures, including those suitable for use in additive fabrication, are provided.

Some embodiments include a method of generating a support structure for an object, the support structure and the object to be fabricated via one or more additive fabrication techniques, comprising identifying one or more regions of the object as one or more regions to which mechanical support is to be provided, identifying one or more support points within at least a first region of the one or more regions, and generating the support structure for the object, the support structure comprising one or more support tips coupled to the object at the one or more support points, the support tips being generated based at least in part on a direction normal to the surface of the object at the respective support point.

Some embodiments provide at least one non-transitory computer readable medium comprising an executable program that, when executed, causes a computer to perform a method of generating a support structure for an object, the support structure and the object to be fabricated via one or more additive fabrication techniques, the method comprising identifying one or more regions of the object as one or more regions to which mechanical support is to be provided, identifying one or more support points within at least a first region of the one or more regions, and generating the support structure for the object, the support structure comprising one or more support tips coupled to the object at the one or more support points, the support tips being generated based at least in part on a direction normal to the surface of the object at the respective support point.

Some embodiments provide an object, comprising an object body having one or more regions to which mechanical support is provided, and a scaffolding providing said mechanical support to at least a first region of the one or more regions, the scaffolding comprising one or more support tips coupled to the object body at a respective support point, the one or more support tips being coupled to the object body at an angle normal to the surface of the object at the respective support point, wherein the object body and the scaffolding are fabricated via one or more additive fabrication techniques.

Some embodiments include a method of generating a support structure for an object, the support structure and the object to be fabricated via one or more additive fabrication techniques, comprising identifying two or more support points on the surface of the object, and generating the support structure for the object, the support structure comprising two or more linear support tips with substantially identical cross-sectional areas, wherein the support tips are each coupled to the object at one of the support points in a direction so as to substantially minimize contact between the respective support tip and the object.

Some embodiments include a method for evaluating a support structure associated with a three-dimensional object, the support structure and object to be fabricated via one or more additive fabrication techniques, comprising obtaining a representation of the support structure, wherein the support structure is configured to provide mechanical support to at least a first region of the object, calculating a supportedness value for the first region of the object, the supportedness value being indicative of a degree of support that the support structure provides to the first region, depicting the support structure and/or the object via a graphical user interface, and indicating the supportedness value for the first region of the object by coloring a portion of the graphical user interface using one or more colors, at least one of the one or more colors being based at least in part on the supportedness value.

Some embodiments provide an apparatus for evaluating a support structure associated with a three-dimensional object, the support structure and object to be fabricated via one or more additive fabrication techniques, comprising at least one processor configured to obtain a representation of the support structure, wherein the support structure is configured to provide mechanical support to at least a first region of the object, calculate a supportedness value for the first region of the object, the supportedness value being indicative of a degree of support that the support structure provides to the first region, depict the support structure and/or the object via a graphical user interface presented using a display, and indicate the supportedness value for the first region of the object by coloring a portion of the graphical user interface using one or more colors, at least one of the one or more colors being based at least in part on the supportedness value.

Some embodiments provide at least one non-transitory computer readable medium comprising an executable program that, when executed, causes a computer to perform a method for evaluating a support structure associated with a three-dimensional object, the support structure and object to be fabricated via one or more additive fabrication techniques, the method comprising obtaining a representation of the support structure associated with a three-dimensional object, wherein the support structure is configured to provide mechanical support to at least a first region of the object, calculating a supportedness value for the first region of the object, the supportedness value being indicative of a degree of support that the support structure provides to the first region, depicting the support structure and/or the object via a graphical user interface, and indicating the supportedness value for the first region of the object by coloring a portion of the graphical user interface using one or more colors, at least one of the one or more colors being based at least in part on the supportedness value.

The foregoing is a non-limiting summary of the invention, which is defined only by the appended claims.

BRIEF DESCRIPTION OF DRAWINGS

The accompanying drawings are not intended to be drawn to scale. In the drawings, each identical or nearly identical component that is illustrated in various FIGs. is represented by a like numeral. For purposes of clarity, not every component may be labeled in every drawing. In the drawings:

FIGS. 5A-B illustrates flow charts of exemplary processes for generating a support structure for an object, according to some embodiments;

FIG. 8 illustrates an exemplary object and an exemplary support structure, according to some embodiments;

FIG. 9A illustrates a first view of the exemplary object and exemplary support structure shown in FIG. 8 including an indication of the supportedness of the object, according to some embodiments;

FIGS. 10A-B illustrates flow charts of processes for evaluating a support structure associated with an object, according to some embodiments.

DETAILED DESCRIPTION

Figure 1:
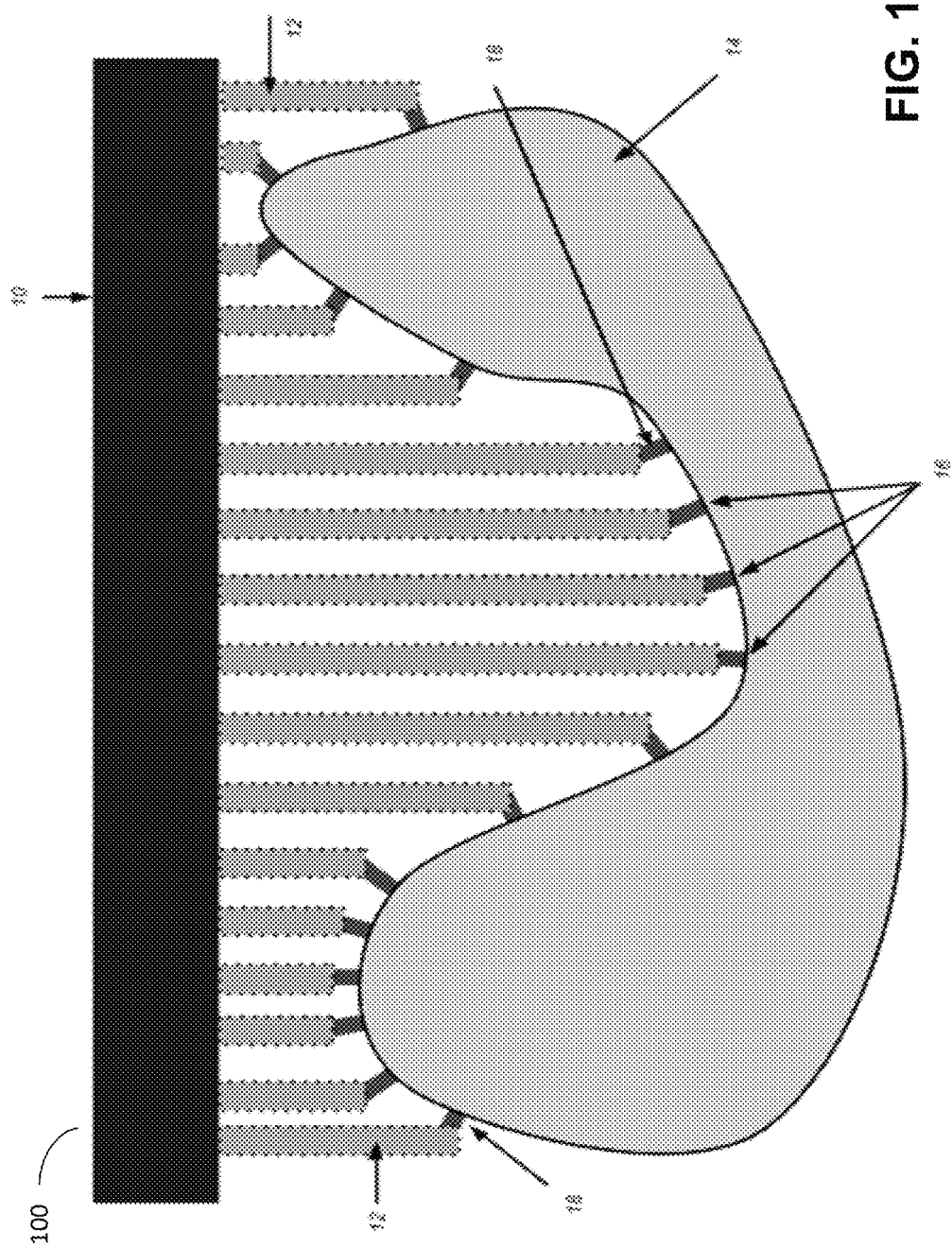
FIG. 1 depicts an object and a support structure that includes support tips, according to some embodiments.

Systems and methods for providing and evaluating support structures, including those suitable for use in additive fabrication, are provided. While support structures can aid in successful fabrication of certain objects, support structures may lead to defects on those objects and may cause a user to spend significant effort in removing the structures. By forming a support structure that minimizes contact with an object being fabricated while still providing sufficient mechanical support to the object, defects can be reduced and removal of the support structure can be made easier without compromising the quality of the fabricated object. In particular, the inventors have recognized and appreciated that the use of support structure attachment points as described herein (also referred to as "support tips" or "tips") may result in superior performance, easier post-processing, and cleaner removal than conventional support techniques. Support tips may be fabricated using the same and/or different materials than are used to fabricate the underlying support structure.

In some embodiments, a support structure may be generated that includes one or more support tips that couple the support structure to an object. Support tips may be oriented so as to limit the area of the surface of the object that makes contact with the support tips, thereby reducing the number and/or size of defects that remain on the object after the support structure has been removed. For example, the support tips may be oriented normal to a point on the surface of the object where the support structure and object are coupled to one another. The normal orientation may, for at least some support tip geometries, ensure that a minimal area connects the support structure to the object.

In some embodiments, a support structure may include one or more support tips oriented in directions based upon expected forces at the locations at which the support tips are coupled to an object. For example, in some use cases it may be beneficial to balance a desire for easy removal of the support structure (which, as described above, may include the use of normally-oriented support tips) with forces expected to be exerted during the fabrication process. Accordingly, in some embodiments, support tips may be provided with an orientation based on a determination of the mechanical support sufficient to support a region of an object (e.g., lesser support may result in damage to the object during fabrication). The resulting support tip orientation may provide both an improved removal process compared with conventional support structures while also ensuring that sufficient mechanical support is provided during the fabrication process. In some embodiments, the orientation of a support tip is determined by applying an offset based on a determination of the mechanical support sufficient to support a region of an object to a direction normal to the surface of the object at the location where the support tip couples to the object.

In some embodiments, support tips may be provided in a support structure wherein one or more of the support tips are mechanically weaker than the bulk of the support structure. For example, support tips may be thinner than aspects of the support structure. This may further aid a user in removing the support structure from an object with less damage to the object, and may additionally maximize clearance between the support and the object, thereby allowing the user to remove the support structure with greater ease.

In some embodiments, the mechanical strength of one or more support tips in a support structure is based on the self-supportedness of a region of an object to which the support structure is coupled. For example, a flat downward facing region of an object may demand extensive support to avoid distortion and reduce cosmetic defects, and thus may demonstrate a low amount of self-supportedness; whereas a flat and almost vertical region may be largely supported by regions beneath it and thus may demonstrate a high amount of self-supportedness. In some use cases, therefore, it may be beneficial to provide mechanically stronger support tips to regions having comparative low self-supportedness compared with regions having comparatively high self-supportedness.

In some use cases, differing portions of an object may, at different times during the fabrication process, experience forces of different magnitudes and directions. Accordingly, in some embodiments, support tips may have a mechanical strength that is based, at least in part, on forces expected to be experienced by portions of the object during fabrication. For example, the stereolithography process used by machines such as the Form 1 from Formlabs, utilizes a "peel" step which separates cured resin from the bottom of a transparent tray of resin by pivoting the tray at an axis at one end. The Form 1 system is described more fully in one or more of U.S. patent application Ser. No. 13/848,979, filed Mar. 22, 2013 and titled "3D Printer with Self-Leveling Platform"; and U.S. Patent Application Ser. No. 61/808,714, filed Apr. 5, 2013 and titled "Three-Dimensional Printing with Customizable Support Structures," the disclosures of which are incorporated by reference herein in their entireties. A "peel" step, as described above, can exert a greater force on parts of the object and part of the support structure that are further from the axis. Accordingly, it may be beneficial in this use case to increase the mechanical strength of support tips based on their distance from the pivot axis, for example to increase the strength in proportion to the distance from the axis.

While the advantages of support tips as described herein may provide for superior performance, easier post-processing, and cleaner removal than conventional support techniques, trial and error on the part of a user may still be required in order to produce a support structure having adequate mechanical support. In many use cases, there is a varying degree of support that can be provided to an object, for example, in terms of the volume of the support structure and in the number of points of contact between the support and the object being fabricated. A support structure including support tips as described herein may not inherently guarantee that sufficient mechanical support has been provided by the support structure, and a user may not be able to ascertain whether such support has been provided without spending time fabricating the object and assessing its quality.

Accordingly, the inventors have further recognized and appreciated that providing an indication of supportedness of one or more regions of an object based on a support structure can provide immediate feedback to a user, and may thereby allow a user to generate sufficient support for an object without spending time fabricating the object. By additionally including support tips in the support structure, a user may ensure that an object will be supported in the desired way while also minimizing the support structure's effect on the quality of the fabricated object.

In some embodiments, the supportedness of one or more regions of an object is presented to a user via a graphical user interface (GUI). For example, a visual indication of supportedness provided via a user interface, which may include but is not limited to text, pictures, object shading, patterns, popups, colors, and/or combinations thereof may be used to provide information to a user about the supportedness of one or more regions of an object to be fabricated (which may include the whole object).

In some embodiments, the supportedness of one or more regions of an object is indicated by coloring one or more elements of the user interface such that the color is indicative of supportedness. For example, areas of an object depicted in a GUI and/or areas of a support structure depicted in a GUI may be depicted using one or more colors that indicate a level of supportedness. In some use cases, it may be beneficial to provide an indication of whether the supportedness of one or more regions of an object is above or below a particular supportedness threshold. For example, regions of an object having supportedness above a threshold may be colored using a first color (e.g., green), and regions of the object having supportedness below the threshold may be colored using a second color (e.g., red).

In some embodiments, supportedness of an object is determined by splitting the object into volume elements, or "voxels." This may provide for certain mathematical techniques, such as finite element analysis, to be applied. For example, the supportedness of each voxel may be determined using finite element analysis and thereby by considering the supportedness of neighboring voxels.

Following below are more detailed descriptions of various concepts related to, and embodiments of, 3D printed support structures. It should be appreciated that various aspects described herein may be implemented in any of numerous ways. Examples of specific implementations are provided herein for illustrative purposes only. In addition, the various aspects described in the embodiments below may be used alone or in any combination, and are not limited to the combinations explicitly described herein.

Although the embodiments herein are primarily disclosed with respect to the Form 1 3D Printer sold by Formlabs, Inc., the Assignee of the present application, and with respect to stereolithography, those having ordinary skill in the art will appreciate that the invention is equally applicable to other systems, including any additive fabrication technology that forms objects using layer-based deposition, such as, but not limited to, thermoplastic extrusion. In some embodiments, object and/or support structures fabricated via one or more additive fabrication techniques as described herein may be formed from, or may comprise, a plurality of layers. For example, layer-based additive fabrication techniques may fabricate an object by formed a series of layers, which may be detectable through observation of the object, and such layers may be any size, including any thickness between 10 microns and 500 microns. In some use cases, a layer-based additive fabrication technique may fabricate an object that includes layers of different thickness.

Although particular support generation methods have been described and shown herein, it is envisioned that the functionality of the various methods, systems, apparatus, objects, and computer readable media disclosed herein may be applied to any now known or hereafter devised additive fabrication technique wherein it is desired to add supports to an object being produced.

FIG. 1 depicts an object and a support structure that includes support tips, according to some embodiments. System 100 includes build platform 10 on which object 14 has been fabricated. The object is supported by a support structure which includes scaffolding 12 and interfaces 18. Note that, in the example of FIG. 1 (and in those of FIGS. 2-4), the build platform 10 is situated above the object being fabricated such that the object 14 hangs down from the build platform during the fabrication process. While not all additive fabrication techniques may utilize this configuration, the techniques described below nonetheless also apply to any other type of configuration, including deposition modeling techniques and/or stereolithography techniques in which the build platform is located beneath the object being fabricated.

Scaffolding 12 is coupled to interfaces 18 between object 14 and the support structure. Interfaces 18 are also referred to herein as "support tips" or "tips," which as described above may provide improved performance, reliability, and may reduce the need for post-processing. In particular, the inclusion of support tips 18 in the support structure may allow for support tips to be optimized in ways not suited to the support structure, particularly with respect to the ease with which object 14 can be released from the support tip attachment points.

In the example of FIG. 1, support tips 18 are generated that extend from scaffolding 12 and intersect with object 14 at an angle normal to the interfacing surface 16 of the object. Such support tips are preferably, but not necessarily, mechanically weaker than the scaffolding. By orienting support tips to the normals of an object surface, a user may remove the support structure (being the combination of the support tips and the scaffolding) from an object with greater ease and with less damage to the object. In addition, the use of a normal incident angle may assist a user in applying shear forces to a support tip while separating the support tip from the object, while reducing the likelihood of damage to the object. In these ways, time consuming post-processing can be reduced and object quality improved.

Conventional support structures typically intersect with an object in such a way as to increase the surface area in contact beyond the minimum cross section of the support structure, such as when a support structure impinges on a highly angled portion of the object. In contrast, by positioning support tips using the normals of the object surface, the surface area of contact between a support tip and the object can be maintained at, or close to, the minimum value, regardless of the object geometry.

As shown in the example of FIG. 1, support tips 18 and scaffolding 12 have different orientations. However, the scaffolding may, in other cases, have the same orientation as the support tips if the geometry of the object being fabricated warrants such a configuration (e.g., the object has a lower surface region parallel to build platform 10). In addition, the scaffolding may in general have any suitable geometry and is not limited to the "finger" shaped structure depicted in the example of FIG. 1.

Support tips 18 may have any suitable length, which may be an absolute length, such as between less than 5 mm, such as 1 mm or 0.5 mm. Alternatively, or additionally, a support tip may have a length defined in proportion to an element of a scaffolding to which the support tip is coupled; for example, less than 10% of a length of a scaffolding element.

It will be appreciated that, while the term "normal" is used herein to describe the orientation of certain support tips, this may, in some use cases, refer to support tips oriented in a direction that is not, in a mathematical sense, precisely 90° from a direction tangential to the surface of an object. One of ordinary skill in the art will appreciate that computational methods and techniques, including those described herein, may produce orientations close to, but not exactly equal to, 90°, and that it is within the scope of the term "normal" as used herein that an orientation may not be equal to precisely 90° from a direction tangential to a surface. As non-limiting examples, support tips may generated so as to be oriented between 80° and 100° from a direction tangential to the surface of an object; may be generated so as to be oriented between 85° and 95° from a direction tangential to the surface of an object; and/or may be generated so as to be oriented between 87.5° and 92.5° from a direction tangential to the surface of an object.

Similarly, the orientation of one or more support tips may be determined based on a normal direction that is not, in a mathematical sense, precisely 90° from a direction tangential to the surface of an object. Computational techniques may provide an estimate of a normal direction, but due to limitations inherent in performing calculations based on a finite number of data points (e.g., data points representing an object), a best estimate available may, in some cases, not be equal to a mathematically precise normal direction that could have been analytically calculated on a purely mathematical object. It will be appreciated that various computational techniques may be used to determine a normal direction, and any such techniques that provide an estimate of such a direction are within the scope of determining a direction "normal" to a surface as described herein. For example, some computational techniques to estimate a normal direction may generally provide orientations that are within an error range (e.g., 10%) of the mathematically precise direction that is 90° from a tangent to a surface, but due to limited information may in some cases produce orientations that are as much as 45° from the precise normal direction. It is within the scope and spirit of the present invention that mathematical techniques used to determine a normal direction may, in some cases, produce orientations that are as much as 45° or more from the precise normal direction for points on the surface of an object, yet in general for the same object will produce orientations that are much closer to the precise normal direction (e.g., within 10%).

As one non-limiting example of determining a direction normal to a surface of an object, the normal for a given location on the object may be calculated by use of the following voxel approximation technique. A voxel representation is constructed for the object which comprises filled voxels that represent the surface and/or the interior of the object, and comprises empty voxels that represent the exterior of the object. In such a representation, a voxel with an exposed face is a voxel wherein at least one side faces an empty voxel. A cubic voxel has six faces that may be exposed, and so such a voxel may have exposed faces in some combination of the +X, −X, +Y, −Y, +Z, and −Z directions. A voxel may also be surrounded by other filled voxels and thus may have no exposed faces. To estimate a normal for a given location on the object using such a representation, a voxel containing the location is first identified. Using the identified voxel, surrounding voxels in a cube centered on the identified voxel are sampled to identify voxels with exposed faces (e.g., sampling voxels in such a cube having 7 voxels along each side). For each sampled voxel with an exposed face, unit vectors are generated based on the exposed faces. For example, a voxel with exposed +X and −Y faces would be decomposed into two unit vectors, one in the +X direction and one in the −Y direction. After decomposing each exposed voxel in the cube, the normal for the given location is approximated by performing vector addition of all unit vectors from all decomposed exposed faces, centering the origin of the resulting normal vector at the center of the identified voxel.

The above non-limiting description is provided merely to illustrate one possible exemplary technique for determining a direction normal to a surface of an object, and it will be appreciated that any other technique, including variations of the above-described technique, may be applied to processes of generating and evaluating support structures described herein.

Figure 2:
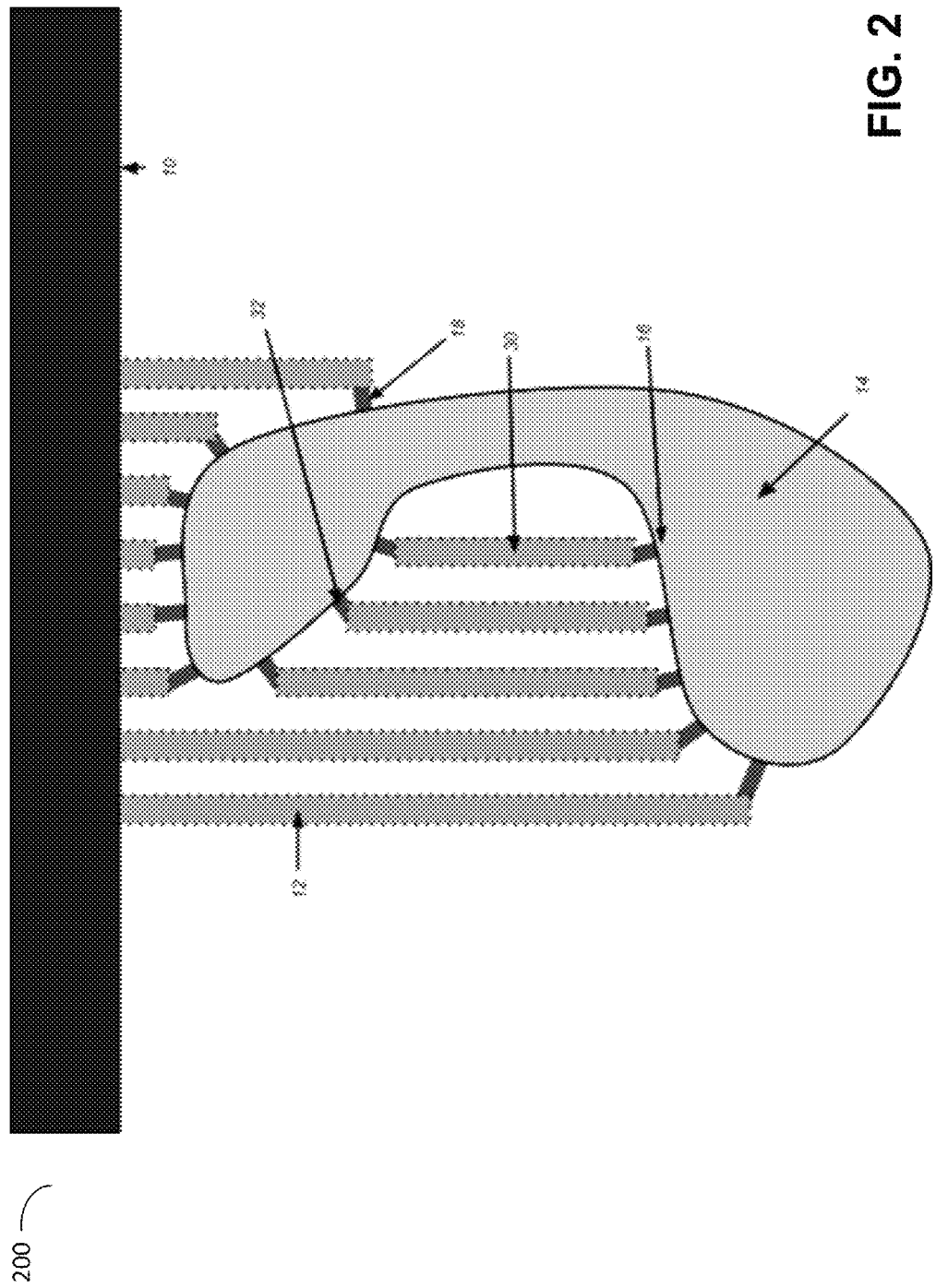
FIG. 2 depicts an object and a support structure that includes support tips internal to the object, according to some embodiments.

FIG. 2 depicts an object and a support structure that includes support tips internal to the object, according to some embodiments. As shown in the example of FIG. 2, support tips may also be employed in situations in which the base of support scaffolding 30 attaches to an object 14 at its base, rather than to the build platform 10 as in the example of FIG. 1. In such cases, the support scaffolding 30 may also be connected at the base to the build platform, underlying build platform "raft" structures, or areas of object 14 using support tips 32 that intersect with the relevant surfaces of the object at an angle normal to said surfaces.

Figure 3:
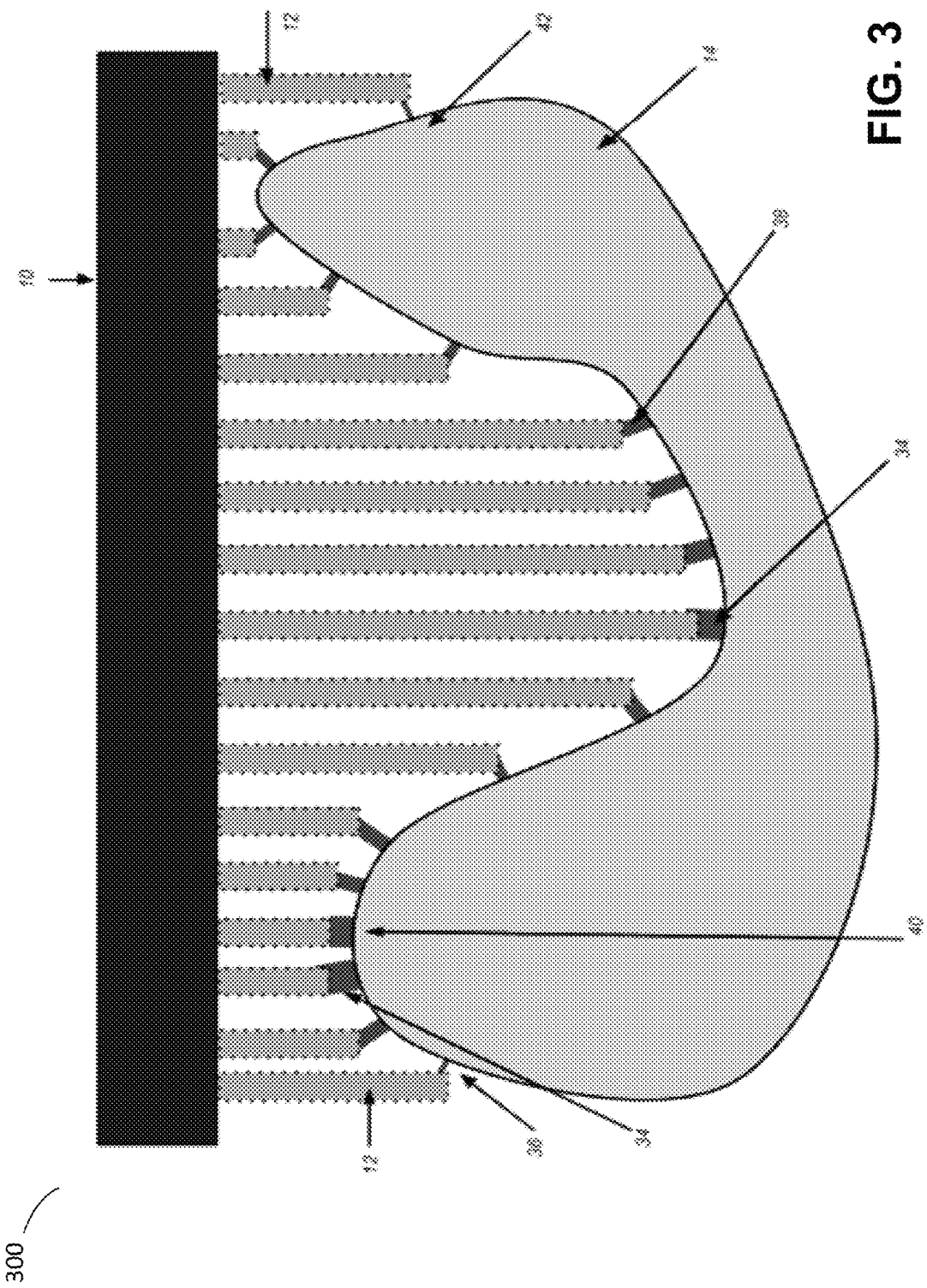
FIG. 3 depicts an object and a support structure that includes support tips whose geometry is varied based on self-supportedness of the object, according to some embodiments.

FIG. 3 depicts an object and a support structure that includes support tips whose geometry is varied based on self-supportedness of the object, according to some embodiments. As described above, it may be advantageous to vary the geometry of an individual support tip, and thus its strength in various directions, based on the degree to which the connection portion of an object is already supported.

As shown in the example of FIG. 3, steep portions 42 of object 14 may be fabricated successfully using relatively little additional support, as the underlying object may provide most, if not all, of the support underneath each layer to be deposited. Accordingly, support tips of minimal strength 36 may be used for these regions. Alternatively, however, flatter downwards facing regions 40, may demand extensive additional support to avoid distortion, higher forces, and reduce cosmetic defects. Accordingly, the support tips 34 for these sections 40 may have a comparatively greater strength. The strength of a support tip may be adjusted in any suitable way, including, but not limited to, adjusting the diameter of the support tip, adjusting the length of the support tip, adjusting the cross-sectional shape of the support tip (e.g., using geometries such as "X" shapes, hollow cylinders, triangles, rhombuses, rectangles, etc.), or combinations thereof.

The relationship between the degree of support provided by the object being fabricated and the optimal size of support tips may exist along a continuum, such that areas of intermediate supportedness receive intermediate strength support tips 38.

Figure 4:
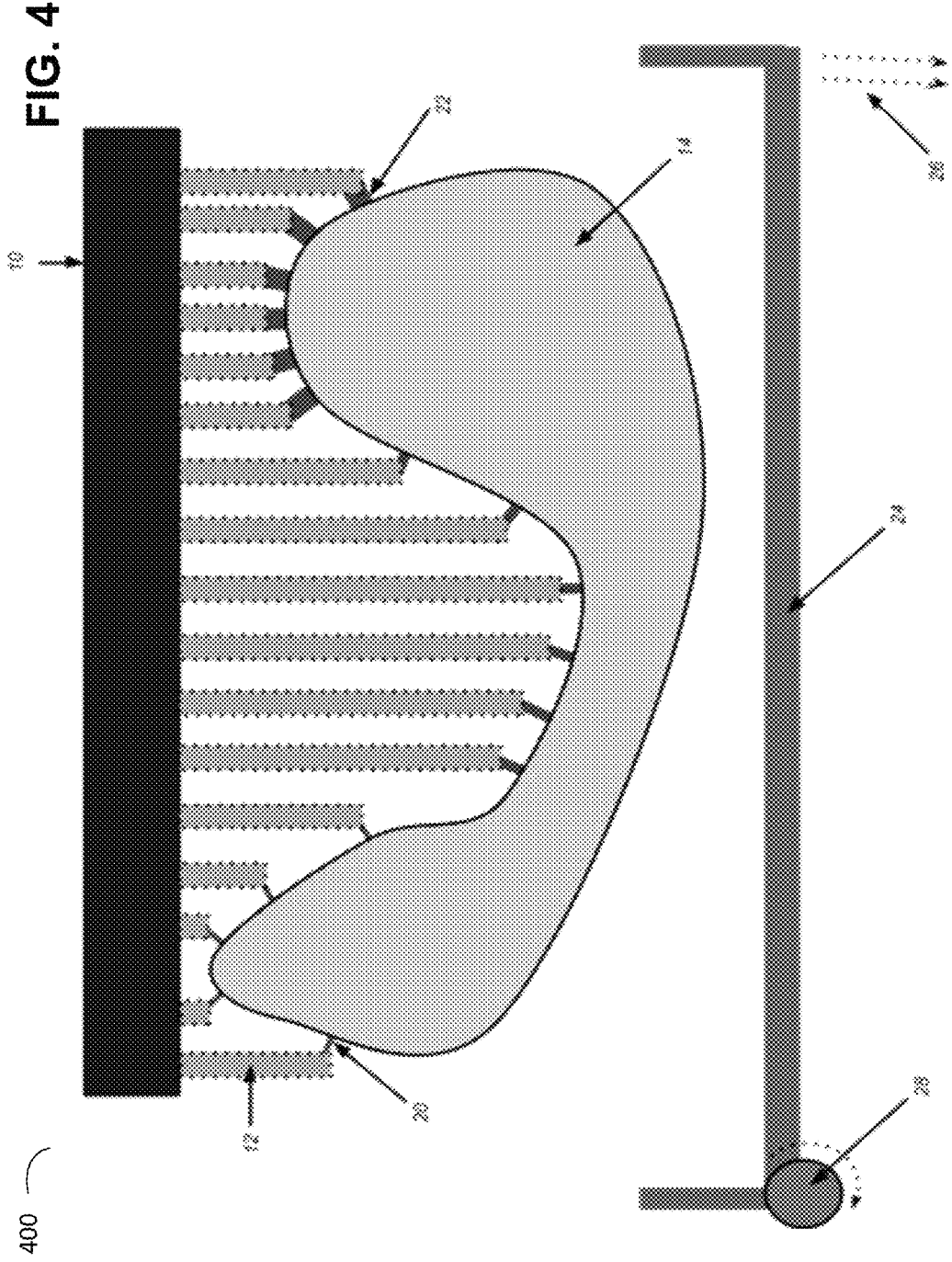
FIG. 4 depicts an object and a support structure that includes support tips whose geometry is varied based on distance from an axis applying forces during a fabrication process, according to some embodiments.

FIG. 4 depicts an object and a support structure that includes support tips whose geometry is varied based on distance from an axis applying forces during a fabrication process, according to some embodiments. As discussed above, it may be advantageous to modify one or more support tips to improve the support provided to an object with regards to forces exerted during the building process. One such example is illustrated in FIG. 4, which includes a stereolithographic printer 400 that utilizes a "peel" step which separates cured resin from the bottom of a transparent tray of resin 24. During operation, the resin tray 24 may be pivoted on its axis 28 causing downward motion 26, causing a greater force to be exerted on areas of the object further from the axis due to surface tension of liquid held in the tray.

As shown in the example of FIG. 4, those support tips 22 located further away from the axis of the tank 28 may be provided with greater strength than those located closer to the axis 20. The strength of a support tip may be adjusted in any suitable way, including, but not limited to, adjusting the diameter of the support tip, adjusting the length of the support tip, adjusting the cross-sectional shape of the support tip (e.g., using geometries such as "X" shapes, hollow cylinders, triangles, rhombuses, rectangles, etc.), or combinations thereof.

As shown in FIG. 4, support tips including tips 20 and 22 are oriented normal to the surface of object 14 at the location where the support tips are coupled to the object. However, support tips may alternatively be oriented at an angle offset from the normal in order to further optimize the characteristics of the support structure by modifying the breaking strength of support tips when exposed to forces from differing directions.

FIG. 5A illustrates a first flow chart of a process for generating support structure for an object, according to some embodiments. Method 500 begins with step 502, in which one or more regions to which support is to be provided are identified. The identification may be performed by analyzing one or more regions of the object, and/or may be identified by received data (e.g., from another device). In use cases in which the regions are identified by analyzing an object, any suitable technique or techniques for making such a determination may be used. In addition, an object being analyzed and/or data identifying one or more regions may be accessed in any suitable manner, including by accessing one or more computer readable media (including volatile and/or non-volatile media), receiving object data via a wired or wireless communication link, or combinations thereof.

In step 504, one or more support points within a region of the object are identified. The identification may be performed by analyzing one or more regions of the object, and/or may be identified by received data (e.g., from another device). In some embodiments, preference is given for locating support points along edges or other surface discontinuities of an object in order to reduce visible artifacts.

In some embodiments, the one or more support points include one or more points located interior to the surface of an object. A support tip generated using one of these support points may therefore protrude some distance into the object, for example between 0.1 mm and 1.0 mm, such as 0.2 mm, into the object. Such a support tip may have increased mechanical strength compared with a support tip that ends at the surface of the object, while not increasing the likelihood of defects present on the object after removal of the support structure. Support tips that protrude into an object may have an orientation determined based on a direction normal to the surface of the object at a point in close proximity to the support point, such as the point on the surface closest to the support point.

Irrespective of how the support points are identified, in step 506 a support structure that includes support tips is generated. As described above, support tips may be coupled to a previously-identified support point. The orientations of support tips included in the generated support structure are oriented, at least in part, based on directions normal to the surface of the object at the support points. In use cases where one or more support points are located within the surface of the object, the normal direction used to determine the orientation of a support tip coupled to the interior support points may be a direction normal to a point on the surface in close proximity to the support point, such as the point on the surface closest to the support point.

In some embodiments, an orientation of at least one support tip included in the support structure is calculated by determining an offset from the direction normal to the surface at the corresponding support point. For example, a support tip may be oriented at an angle offset from the normal, which may increase the breaking strength of the support tip when exposed to a force in a particular direction.

Figure 5B:
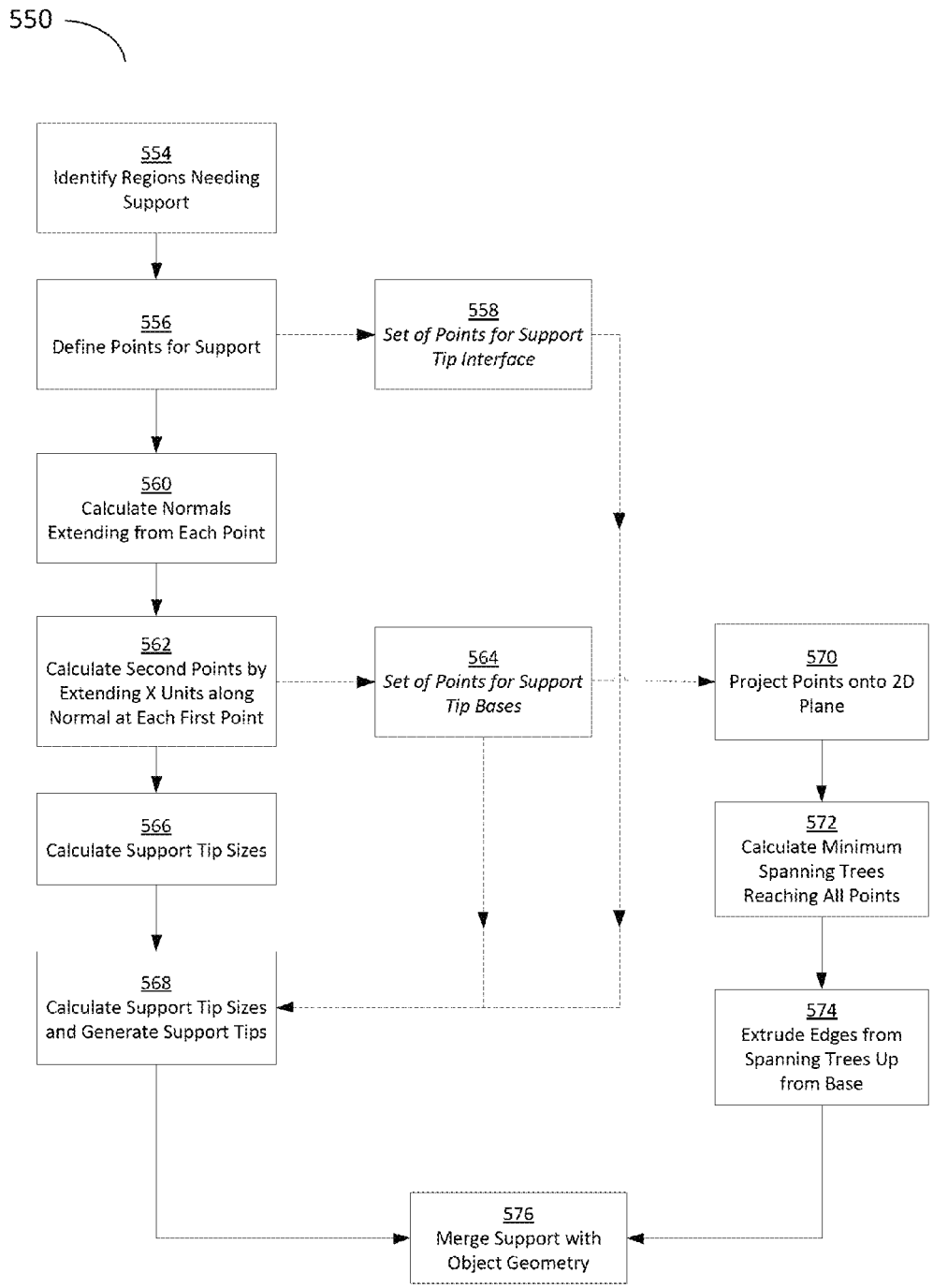

FIG. 5B illustrates a second flow chart of a process for generating support structure for an object, according to some embodiments. Method 550 begins with step 554, in which an object is analyzed to determine which portions of the object may need support in order for those regions to be fabricated successfully. Any suitable technique or techniques for making such a determination may be used, including but not limited to calculations for determining supportedness as described herein. An object being analyzed using in step 554 may be accessed in any suitable manner, including by accessing one or more computer readable media (including volatile and/or non-volatile media), receiving object data via a wired or wireless communication link, or combinations thereof.

At Step 556, one or more candidate positions for support to attach to the object are identified using the information gathered during Step 554. Identification of support attachment locations may be performed in any suitable way, including by analyzing the slope of downward-facing (e.g., facing toward a build platform) surfaces, detecting local low points, and/or by performing a Boolean comparison of sequential layers to detect unsupported areas.

For each point identified on the object for support, the direction of the normal at that point is calculated based on the geometry of the object during Step 560. In some use cases, geometry describing an object may be stored in an electronic format wherein normals for each triangle in a mesh of triangles are stored along with the coordinates of the triangle in 3D space. Accordingly, in some embodiments, one or more normals are calculated at a respective point by determining the ID of the triangle at that point in order to look up the normal associated with that triangle. Each normal may then be stored as a vector value for a given support point.

In Step 562, a second set of points are generated which are each a predefined distance from the object's surface, calculated using normal vectors identified in Step 560. In some embodiments, a point is calculated by determining an offset from a support point in the direction of the normal vector. The offset distance is preferably such that a sufficiently long support tip is generated to allow for the support to be easily broken away from the object, but not so much as to cause unwanted breaks to occur during the fabrication procedure. Such a distance may depend, at least in part, on the structural properties of the material used to fabricate the support. In some embodiments, the offset distance is 1.0 mm or less. In some embodiments the offset distance may depend on additional factors, such as the cross area of the support tip, the angle between the support tip and the support scaffolding, the geometry of the desired object, and/or other build parameters such as layer height, peel settings, or resin type.

After the completion of the extensions along normals, two sets of points have been defined: a first set of points located on the surface of the object representing the location where the support tip will be created to intersect with the object; and a second set of points, located the predefined distance from the object, representing the location where the support tip will join with support scaffolding extending up from the build platform or, in the case of internal supports, from a support tip attaching the support scaffolding to the object.

Following the generation of support tip length and direction, the appropriate geometry of each support tip is determined in Step 566. In some embodiments, support tip strength is controlled by altering the dimensions, and thus the cross sectional surface area, of a rectangular prism. In some embodiments, support tips include rectangular prisms having dimensions of 0.5 mm by 0.5 mm.

In some embodiments, the dimensions of the support tip may be further modified with reference to multiple weighted factors including the distance from the axis and the supportedness, the results of mechanical analysis of the material, and/or an extent to which the object demands support at each contact point as indicated. When using a strength determination, support tips are added to the model of the object in Step 568 such that each has a surface area and dimensions that depend on the strength determined in the preceding step.

In Step 568, the support tips are generated based at least in part on the set of points on the surface of the object identified in Step 556, and on the set of support tip base points identified in Step 562.

In Steps 570-574, the underlying support scaffolding that connects to the base of each support tip is generated. In some embodiments, the second set of points generated above in Step 562 are projected onto a 2-dimensional plane representing the build platform (Step 570). Using each point as a node, a set of paths between connected nodes may be generated in Step 572 by calculating a minimum spanning forest or other graph structure connecting all nodes. For example, algorithms such as but not limited to Prim's, Kruskal's or Boruvka's algorithm may be used to calculate the edges of such a spanning forest.

In Step 574, the edges identified in Step 572 are extruded up from the build platform, forming thin walls of a predefined thickness. These walls provide the support scaffolding connecting to the base of each support tip. Each portion of the wall is extruded upwards until it contacts the base of the support tip or, alternatively, it comes within a preset distance of an object. The generation of support scaffolding using minimum spanning trees presents several advantages over the techniques known previously in the art. In the first instance, minimum spanning trees use comparatively less material than structures known in the art, such as linear grids or vertical pins, while providing enhanced stability through the intersection of multiple walls at nodes with several edges. Such intersections, moreover, provide increased stability over prior art structures such as vertical pins while using less material and being more easily removed than other prior art structures such as linear grids.

Finally, both the walls forming the support scaffolding and support tips are combined into the model for printing in Step 576.

Figure 6A:
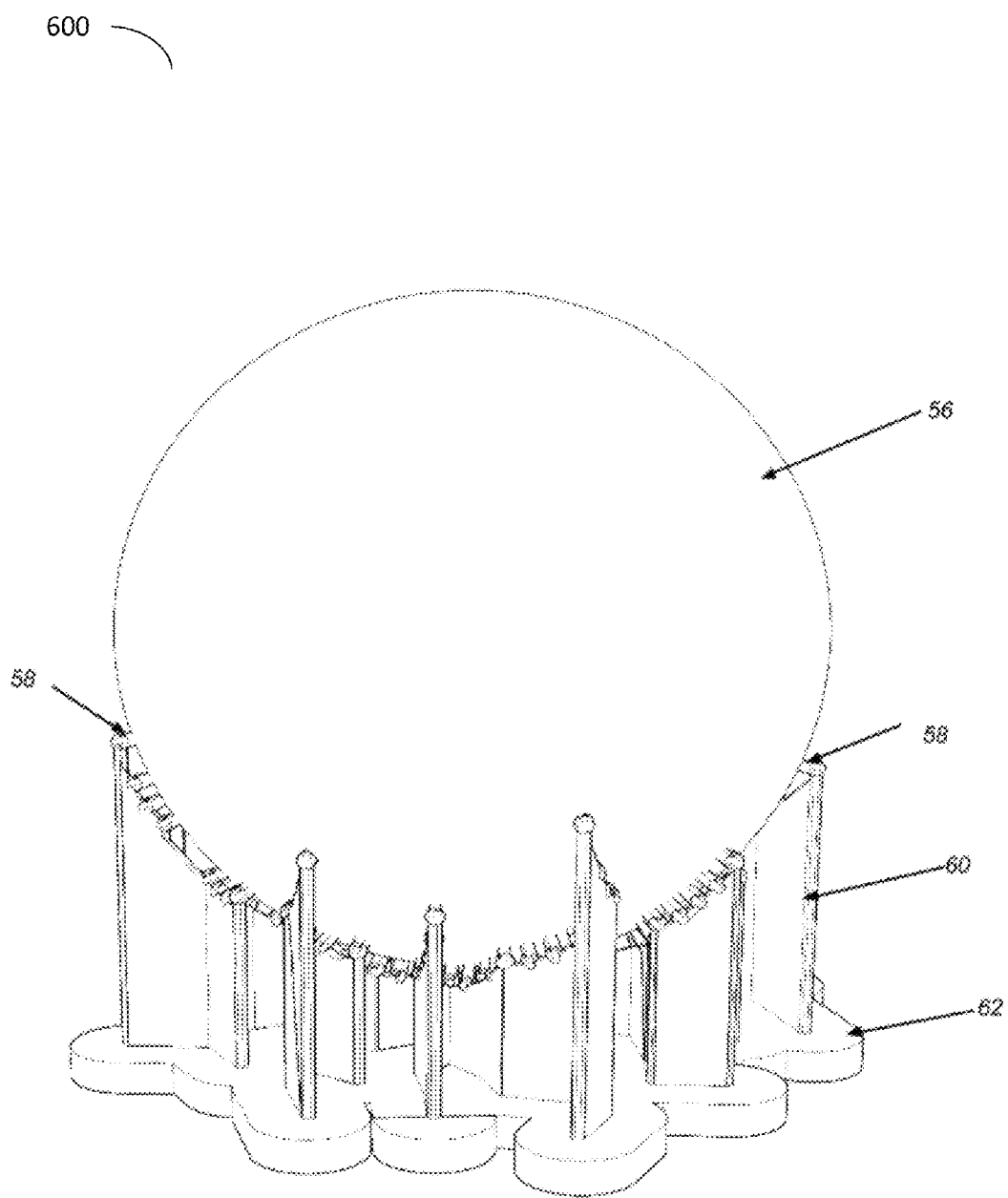
FIG. 6A illustrates an isometric 3-D representation of a support structure for a spherical object, according to some embodiments.
Figure 6B:
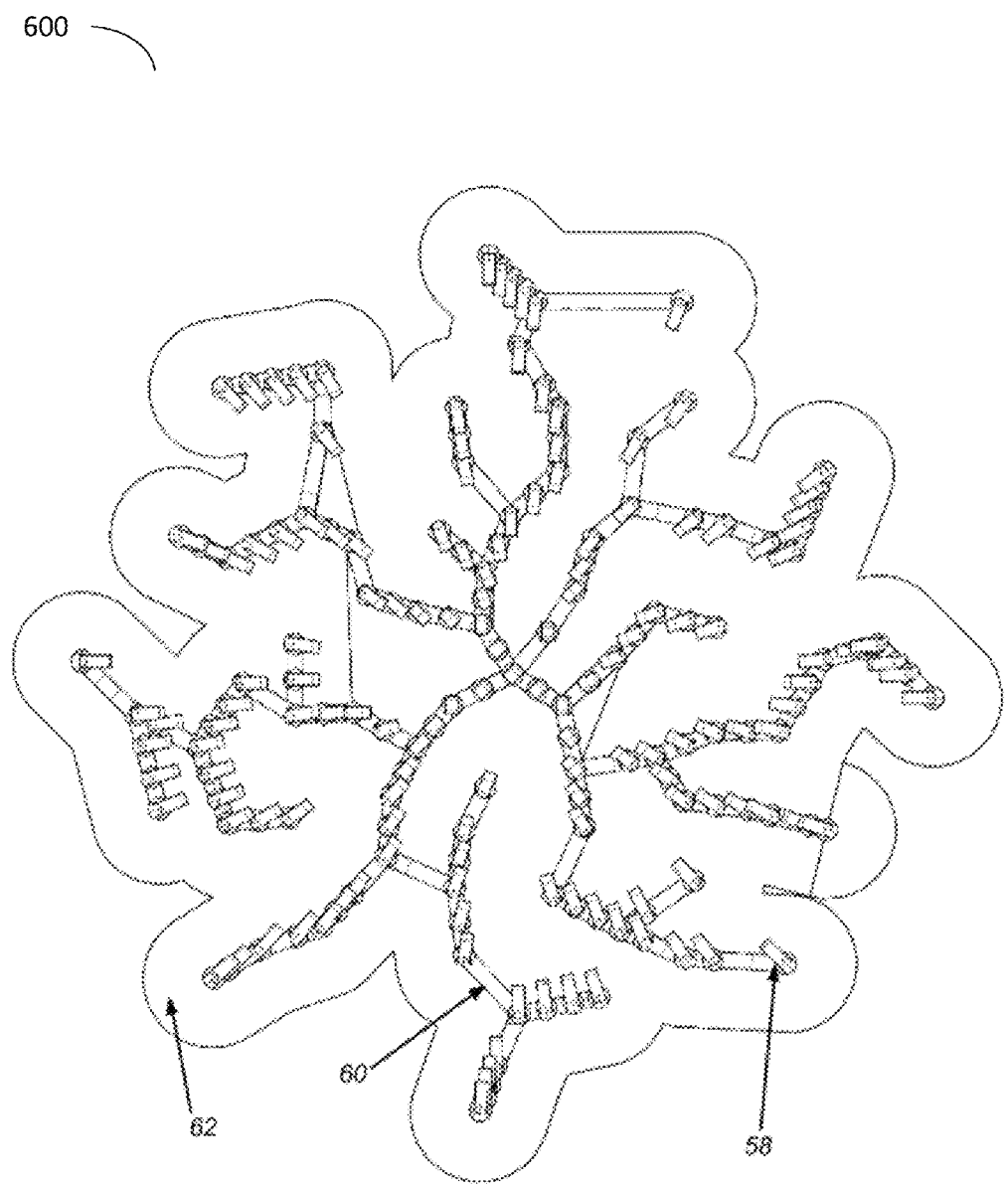
FIG. 6B illustrates an top-down 3-D representation of the support structure shown in FIG. 6A, according to some embodiments.

FIG. 6A-B illustrate isometric and top-down 3-D representations of a support structure for a spherical object, according to some embodiments. As depicted in the example shown in FIGS. 6A and 6B, the resulting structure generated in order to support object 56, which is a sphere, consists of support tips 58 oriented with the normals of the intersecting surface, which are in turn supported by scaffolding 60 arranged in a graph structure connecting each support point and attaching the support point to a base 62. Such graph structures may include structures such as minimal spanning trees or other graphs. In addition, graph structures may be optimized for additional parameters other than material usage, including desired weakness in particular directions, increased strength in particular directions, and/or to accommodate particular regions of object geometry, such as flat downwards or upwards facing surfaces.

As discussed above, support tips may be created as rectangular prisms. However, other shapes, including cylinders or triangular prisms, may alternatively or additionally be used for support tips within a support structure. In some embodiments, dimensions of the support tips can vary along different axes. Such asymmetric support tips may be used, for example, to resist forces during the fabrication processes expected along certain vectors while permitting removal by the user with reduced force.

Figure 7A:
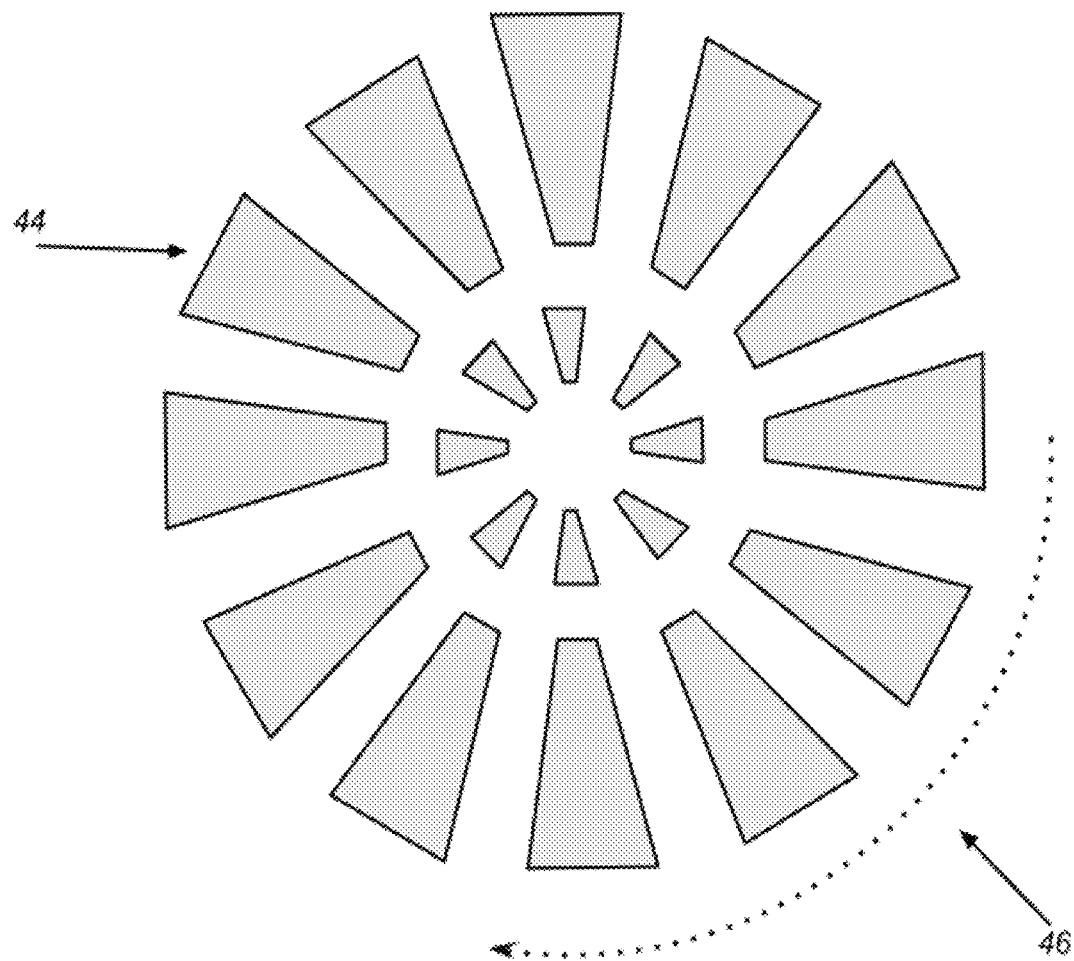
FIG. 7A illustrates a top-down schematic view of a first arrangement of support tips arranged radially with long axis directed out from the centroid of an object, according to some embodiments.

FIG. 7A illustrates a top-down schematic view of a first arrangement of support tips arranged radially with long axis directed out from the centroid of an object, according to some embodiments. As can be seen in FIG. 7A, support tips 44, not drawn to scale, may interface with an object with a greater length than width. As further shown, such support tips 44 can be advantageously oriented so as to ensure that the long axis of each support tip runs tangent to lines extending out from the centroid of the object. Alternatively, or additionally, support tips may be arranged so as to place the long axis of each support tip tangent to lines extending out from the centroid of the support location or tangent to lines extending out from a predefined point in space.

Figure 7B:
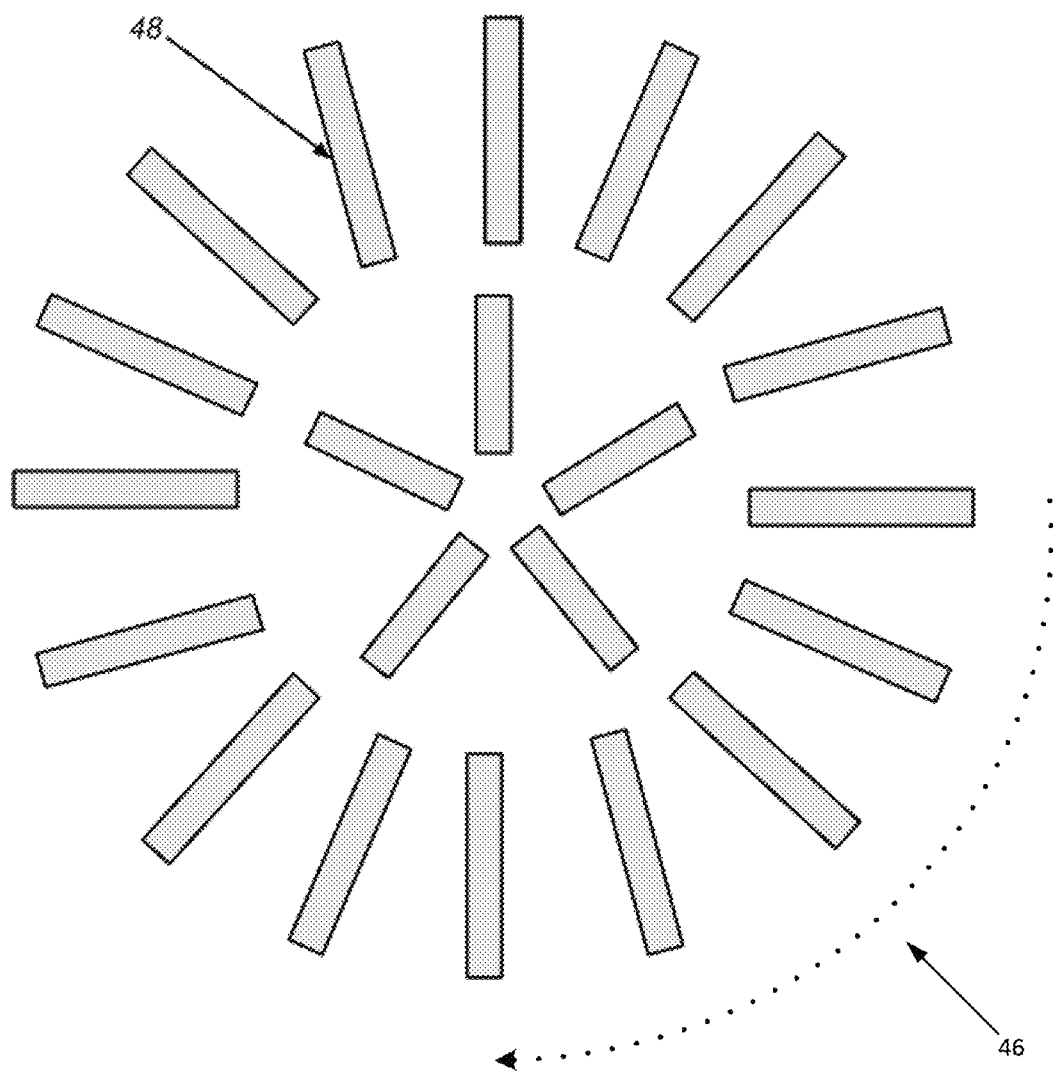
FIG. 7B illustrates a top-down schematic view of a second arrangement of support tips arranged radially with long axis directed out from the centroid of an object, according to some embodiments.

FIG. 7B illustrates a top-down schematic view of a second arrangement of support tips arranged radially with long axis directed out from the centroid of an object, according to some embodiments. As shown in FIG. 7B, support tips 48 may be rectangular in cross-section. One having skill in the art will appreciate that a wide range of shapes may be used such that high aspect ratio shapes are oriented with the long axis of the shape pointing away from a centroid of an object. Advantageously, such support tips may resist the typically linear forces of the additive manufacturing process, but may be removed from the desired object by the application of a comparatively lower rotational force 46.

Figure 7C:
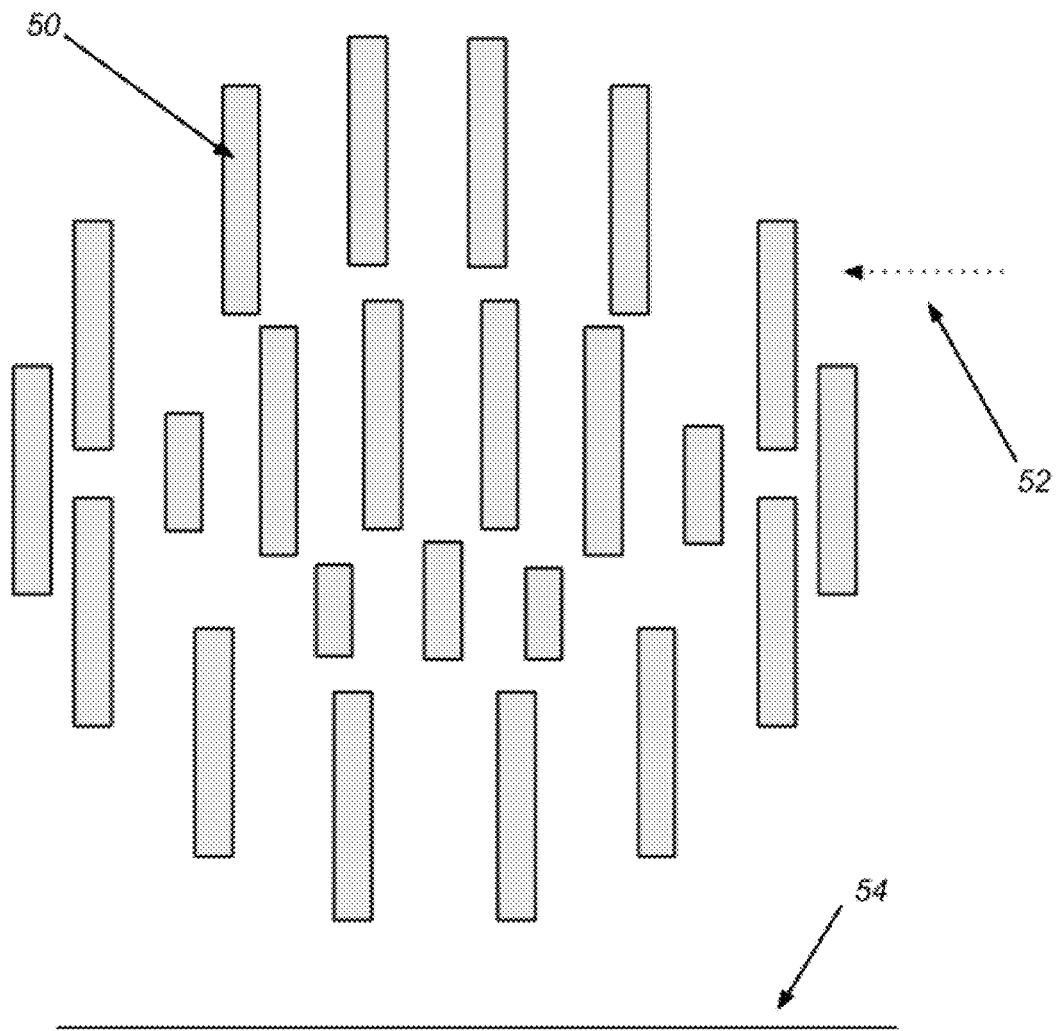
FIG. 7C illustrates a top-down schematic view of support tips arranged linearly with a long axis directed orthogonally from an expected direction of a force exerted during a fabrication process, according to some embodiments.

FIG. 7C illustrates a top-down schematic view of support tips arranged linearly with a long axis directed orthogonally from an expected direction of a force exerted during a fabrication process, according to some embodiments. In the example of FIG. 7C, the geometry of individual support tips are arranged so as to position the long axis of each support tip at a 90 degree angle to the direction of a force expected during the build process such as, for example, rotation or tilting about an axis 54. As above, such a configuration may provide substantial resistance to forces exerted during the building process while allowing for easier removal by the application of force 52 at an orthogonal angle to such build forces.

As discussed above, because support structures, even those including support tips, can have negative impacts on the desired final object, it may be beneficial to allow a user to review where and how support structures will be created and, in certain circumstances, to edit or alter manually or automatically generated support structures so as to direct the placement of the support. However, there has previously been no way for a user to properly evaluate the consequences of placing support structure without experimentation and attempts to print the desired final object using different potential support structures. Such experimentation is costly and wasteful and often does not result in optimal, or even acceptable, placement of support structures.

Accordingly, following below are more detailed descriptions of various concepts related to, and embodiments of, providing an indication of supportedness of an object to a user. By utilizing these indications, the user can ensure that advantageous placement of support structures can be achieved.

It should be appreciated that various aspects described herein may be implemented in any of numerous ways. Examples of specific implementations are provided herein for illustrative purposes only. In addition, the various aspects described in the embodiments below may be used alone or in any combination, and are not limited to the combinations explicitly described herein. For example, the exemplary interfaces shown in FIGS. 9A-C utilize color to provide a visual indication of supportedness of regions of the objects. However, in general any suitable visual indication of supportedness may be provided via a user interface to indicate the supportedness of a region of an object. For example, any shading (including blending of colors) and/or patterning (e.g., striping, cross-hatching, etc.) of one or more GUI elements (e.g., an object being depicted and/or a support structure being depicted) may be used to denote supportedness, with or without the use of multiple colors to distinguish between different supportedness values. Alternatively, or additionally, text, one or more symbols (e.g., arrows, icons, etc.), user controls (e.g., sliders, radio buttons, menu options, etc.), or combinations thereof, with or without the use of colors, may be used to denote supportedness either alone or in combination.

FIG. 8 illustrates an exemplary object and an exemplary support structure, according to some embodiments. FIG. 8 illustrates graphical user interface 800, which displays a three-dimensional view of an object 810 to be fabricated via one or more additive fabrication techniques. Graphical user interface 800 further displays a three-dimensional view of support structure 820 which is also to be fabricated via one or more additive fabrication techniques, and which is configured provide mechanical support to object 810 during fabrication of the object and the support structure.

As shown in the example of FIG. 8, supports 820 for an object 810 desired to be printed are generated between a build platform 805 and certain locations touching the object. These supports may be determined in any suitable manner, including but not limited to, being manually placed using software tools (e.g., computer aided design (CAD) tools) and/or may be automatically generated using any suitable algorithms.

As shown in the example of FIG. 8, support structures need not touch upon the desired object at all points. Although methodologies may exist in the art for determining where support may be provided in order to ensure successful fabrication of an object, it is generally understood that most materials capable of being used in layer-by-layer additive manufacturing techniques possess sufficient mechanical and structural properties that certain portions can be considered self-supporting, despite the fact that there is no layer immediately below said portion. The self-supportedness of a given portion of an object, however, can sometimes be a difference in degree rather than of kind, particularly in instances wherein the user is prepared to accept certain amounts of deformation or other surface imperfections in the final object.

Figure 9B:
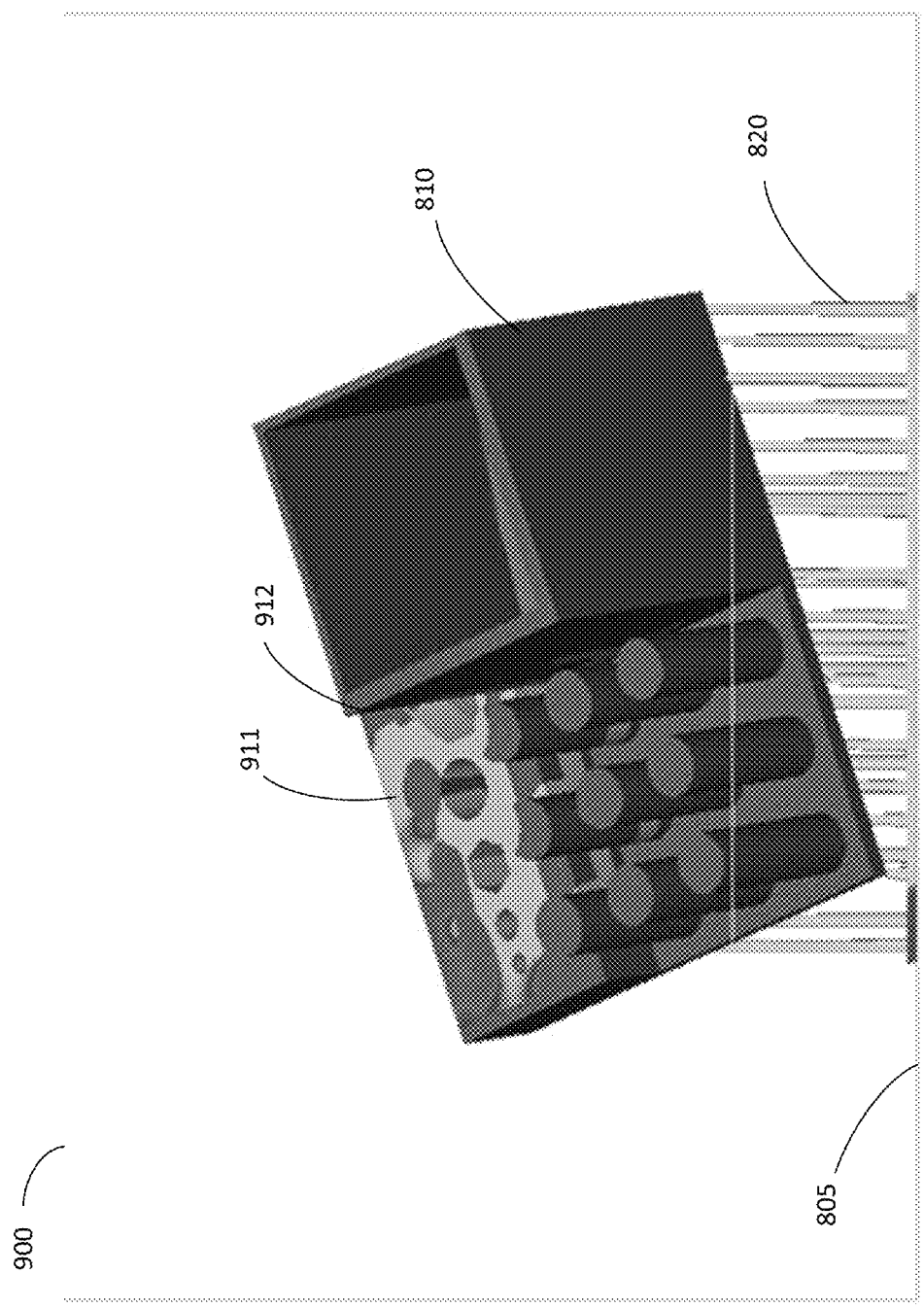
FIG. 9B illustrates a second view of the exemplary object and exemplary support structure shown in FIG. 8 including an indication of the supportedness of the object, according to some embodiments.
Figure 9C:
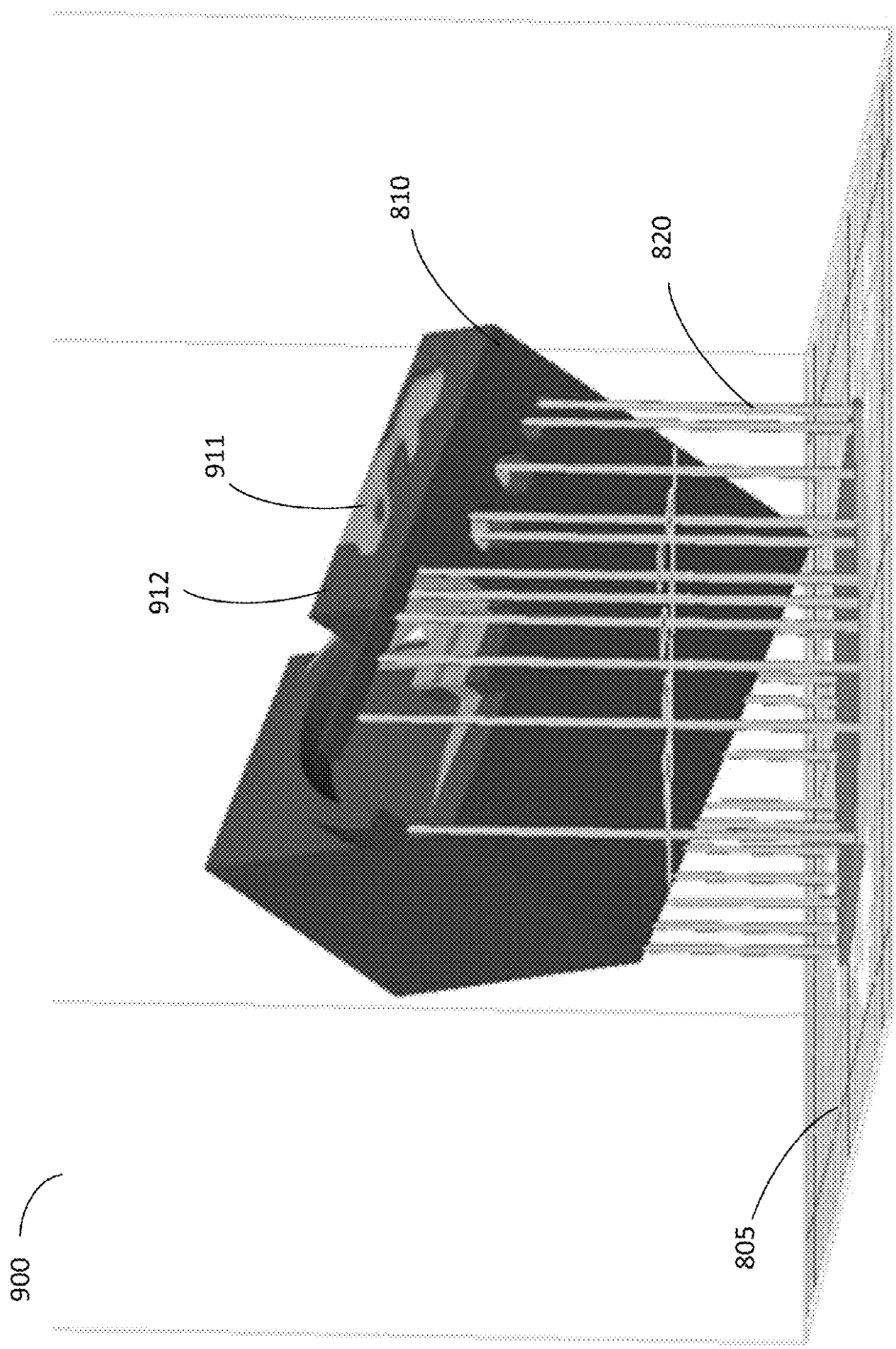
FIG. 9C illustrates a third view of the exemplary object and exemplary support structure shown in FIG. 8 including an indication of the supportedness of the object, according to some embodiments.

FIGS. 9A-C illustrate three views of the exemplary object and exemplary support structure shown in FIG. 8, but additionally include an indication of the supportedness of the object, according to some embodiments. FIGS. 9A-C illustrate graphical user interface 900, which displays a three-dimensional view of object 810. Each of FIGS. 9A-C represents a different view of the object 810 shown in the graphical user interface, for example, by tools to rotate the viewing angle within the interface.

Graphical user interface 900 provides indications for regions 911 and 912 which indicate whether the relevant region of the desired object may have adequate or inadequate support for printing using a specified additive fabrication technique, fabrication material, support structure geometry, and/or build conditions. For any given combination of additive fabrication technique, fabrication material, support structure geometry, and build conditions, the ability of a given layer to be self-supporting may be assessed or determined. As described below, each portion of the object for fabrication is evaluated to determine the extent of its "supportedness," used herein as a term to indicate the varying degree that a portion of the object is mechanically and structurally supported or tied to other portions of the object. It is not necessary that supportedness be exact for the advantages of the present invention to apply. Rather, it is envisioned that supportedness may be an inexact approximation of the mechanical and structural characteristics of an object calculated through various heuristics with predictive value. Using calculated supportedness values, each portion of the desired object can be colored to indicate to the user whether there is adequate support.

Region 911 is displayed using a different color than region 912, which indicates whether the supportedness value of each region is above or below a threshold deemed to be adequate support for a given material under certain build conditions. In the example of FIGS. 9A-C, region 911 has a supportedness value below this threshold, whereas region 912 has a supportedness value above this threshold. In some embodiments, more than two colors are used to indicate the supportedness of regions of an object.

In some embodiments, green coloration indicates a supportedness value above a certain threshold, deemed to be adequate support for a given material under certain build conditions; and red coloration indicates a supportedness value below a certain threshold, which may or may not be the same as the previous threshold, deemed to be inadequate support for a given material under certain build conditions. However, it will be appreciated that these colors are provided merely as an example, as the present invention is not limited to any particular mode of display, and any type of user interfaces may be used to depict similar information.

In some embodiments, a blend of colorations may be used to indicate certain regions with borderline or ambiguous supportedness values. Alternatively, or additionally, a blend of colorations may be used to indicate regions in which the supportedness is transitioning between two values (e.g., between a region of high supportedness and a region of low supportedness). In some embodiments, patterns such as cross-hatching may be used to indicate supportedness of one or more regions.

In some embodiments, based on the properties of the build material, and other parameters of the building process, one or more thresholds used to may be set to differing values. Advantageously, once determined through experimentation on certain test objects, the threshold of a given set of technique, material, and parameters can be reused when indicating the supportiveness of future objects.

Figure 10B:
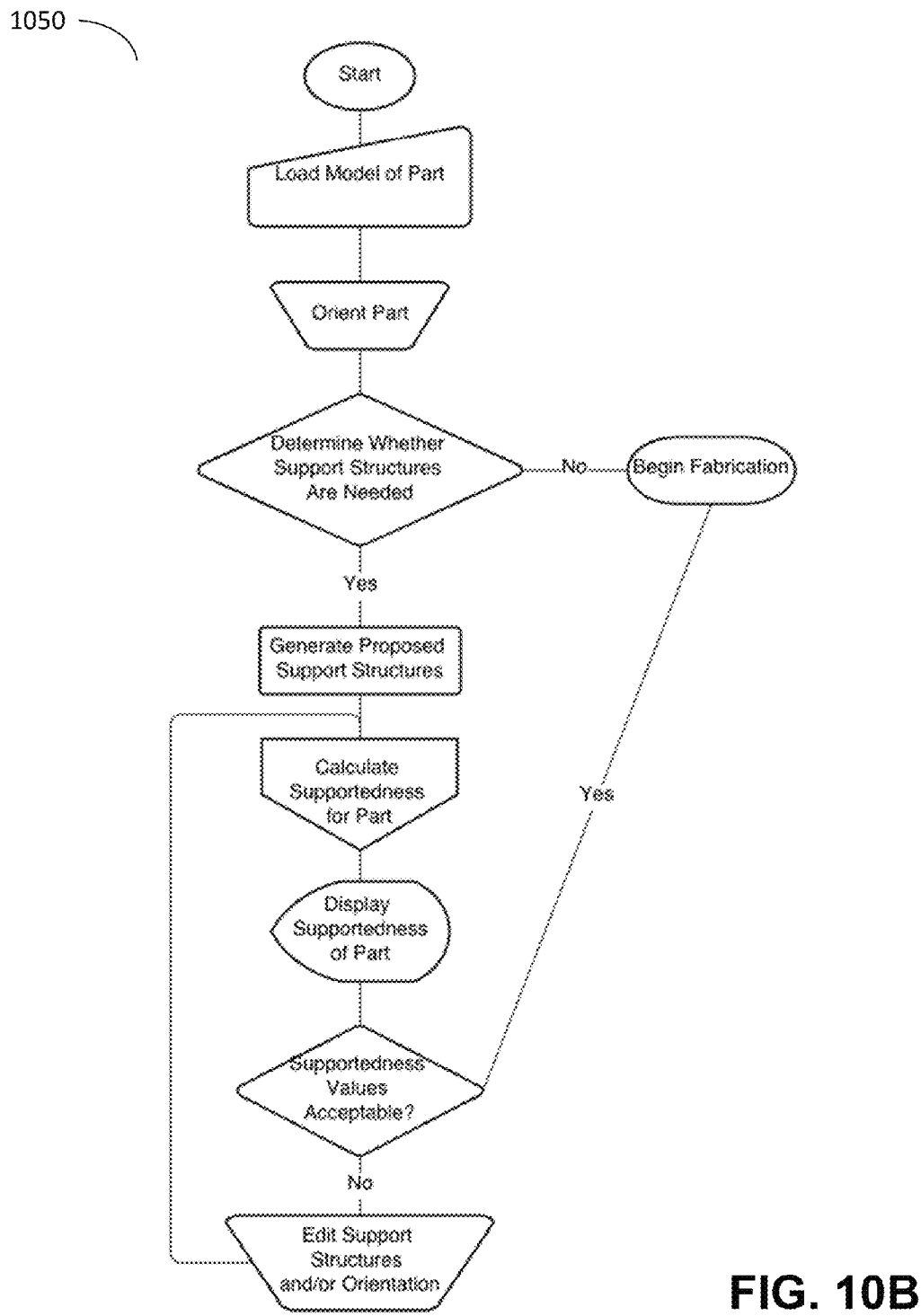

Using the indications depicted in FIGS. 9A-C, the user can take a variety of steps to improve the quality, speed, and cost of the process manufacturing the desired object, such as those depicted in method 1000 shown in FIG. 10A and/or method 1050 shown in FIG. 10B. As one example, a user may choose to edit a support structure in order to add additional supports where a lack of supportedness is indicated. Alternatively, the user may remove support structure where the object has more than sufficient levels of support. As yet another example, the user, and/or an appropriate algorithm, can reorient the object so as to modify the geometry to which a support structure is to be coupled, and thus improve the quality, speed, and cost of the final object. In each of the foregoing examples of user interaction, the techniques described herein can be used to evaluate the relative success or merits of each support structure configuration without needing to run experiments using the actual additive manufacturing process.

FIG. 10A illustrates a flow chart of an exemplary process for evaluating a support structure associated with an object, according to some embodiments. Method 1000 begins with step 1001, in which a representation of a support structure that provides mechanical support to an object is obtained. The support structure may be obtained, for example, by generating the support structure (e.g., generating the support structure based on the object), and/or by retrieving data that describes the support structure.

In step 1002, the supportedness of a first region of the object is calculated. Calculation of supportedness of the object may comprise the determination of any number of supportedness values associated with any number of locations within the first region.

In general, any suitable technique or techniques may be used to evaluate the structural and mechanical properties of an object, any of which may be used to assign a supportedness value to any number of regions of an object. In some embodiments, one or more supportedness values are calculated by the following technique: First, the object is divided into rectangular units of pre-defined and uniform dimensions, such as "voxels." Supportedness values are calculated for each unit of the object, thus providing information that can be used to indicate supportiveness as indicated above. Those units that touch upon units of support structure, or on the build platform, are deemed to have a first supportedness value that indicates completely supported material. Supportedness values of each unit are calculated based on the supportedness of neighboring units in the layer below. Areas outside of the object, and/or voids within the object, are represented by units with a defined supportedness of zero, indicating that they provide no support to neighboring units. Depending on the material or, as described below, the degree of desired accuracy, various functions can be used to derive the supportedness of a unit based on underlying units.

In some embodiments, an analysis is conducted wherein the various physical limitations of the material to self-support, including compressive strength, tensile strength, shear strength, and flexibility are represented and approximated by the application of a single factor, referred to here as epsilon, governing the transmission of "supportedness" through successive voxels. For example, the supportedness of a voxel may be represented as a weighted average, sum, or minima of supportedness contributed by neighboring voxels, weighted by epsilon. Such an approach may reduce the extent to which physical modelling is performed while providing substantial predictive value. In some embodiments, the values of epsilon may depend, at least in part, on the fabrication material used to fabricate an object and/or a support structure. In some embodiments, epsilon is equal to between 0.1 and 0.3, for example 0.2. In general, epsilon values for a given set of build parameters may be determined by experimentation using a suitable test object.

As will be appreciated, various other techniques of calculating the supportedness of a given region of an object may be chosen, depending on the extent of a desire for accuracy, the tolerance for extensive computation, and/or the nature of the material. Depending on a desired degree of accuracy, various techniques such as, but not limited to, finite element analysis or physical models such as Euler-Bernoulli beam calculations, may be used to calculate the degree to regions of the object are supported. Alternatively, or additionally, techniques such as those to calculate the position of support structures, for example, may be modified in order to provide information on supportedness. The techniques disclosed herein, however, are equally applicable to any method of calculating supportedness, so long as said method provides some predictive information regarding how the material would behave when used in an additive fabrication process.

Techniques described herein are applicable to situations wherein, in addition to gravity, support structures are provided to counteract other forces, such as a warping or distorting force caused by curing, deposition, and/or other steps during an additive fabrication process. In addition, a calculation of supportedness may advantageously incorporate parameters regarding the expected process used to finish the object, including whether said finishing process places particular stress on certain regions of the desired object. In such instances, support structures may support the object against forces pulling in multiple vectors. In such instances, supportedness values may be combined in various ways. Depending on the nature of the forces applied against the model during the additive fabrication process, supportedness values can be chosen based on the maximum, minimum, average, or vector product of competing forces. Alternatively, or additionally, such forces may be included within the finite element analysis described above. Alternatively, or additionally, supportedness due to different types of forces may be kept distinct for each region of the model such that the end user can choose to visualize some or all of the independent sets of supportedness values.

In step 1003, the support structure for which a representation was obtained in step 1001 and/or the object is/are depicted via a graphical user interface (GUI). For example, a 3-dimensional representation of the support structure and/or object may be depicted in a GUI. In step 1004, the supportedness of the first region is indicated by coloring a portion of the GUI. While step 1003 and 1004 are described as separate steps in the example of FIG. 10A, it will be appreciated that the actions thus described may be performed simultaneously. For example, the support structure and/or object may be depicted via the GUI at the same time that the supportedness of the first region is indicated.

Coloring the GUI may comprise determining and thus depicting the color, pattern and/or shade of any number of elements of the GUI. It will be appreciated that a single color may be depicted in numerous ways that utilize multiple colors, including but not limited to by dithering, cross-hatching, anti-aliasing, etc. In some use cases, one or more GUI elements may be colored using a plurality of colors (e.g., by shading, dithering, anti-aliasing, etc.). In some embodiments, the color of the first region of the object is determined based on a supportedness of the first region, and indicated via the GUI. For example, when the first region has a supportedness above a threshold, the region of the object may have a first color (which, as described above, may in practice include a mix of colors due to shading or other effects) chosen to denote a level of supportedness above the threshold.

Techniques described herein may be directed to support structures themselves, in addition to, or in alternative to, the supportedness of a given object. While support structure on a given layer may provide support for layers above said given layer, said given layer may itself benefit from support structures below said given layer. In such cases, one or more portions of the support structure may be treated as an object for the purposes of calculating supportedness values.

Although the foregoing examples include embodiments wherein supportedness values are calculated prior to display, other embodiments are possible and within the scope of disclosed aspects of the present invention. As one example, display of indications of supportedness may be performed in parallel with calculations of supportedness such that indications are updated (e.g., on a display) as calculations proceed. In addition, the calculation and indication of supportedness may be limited to a determination at a particular depth of an object, or within a shell surrounding the exterior of the object.

Techniques for determining the supportedness of one or more regions of an object may be based on any suitable representation of the object. For example, as described above, objects may be defined by electronic data, such as an STL file. Regardless of the way in which an object is defined, a representation of the object may be obtained in any suitable way in performing the methods and techniques described herein, including by reading data from one or more computer storage media, or by generating the representation of the object (e.g., using a procedural generation technique). In some embodiments, supportedness of an object is determined, at least in part, by accessing a representation of the object stored on one or more computer readable media, which may be located in any suitable location or locations.

Furthermore, techniques for determining the supportedness of one or more regions of an object may be based on any suitable representation of a support structure. For example, a support structure may be defined by electronic data, such as an STL file, and/or may be generated by suitable software (e.g., generated based on an associated object). Furthermore, the representation of the support structure may be obtained in any suitable way, including by generating the support structure (e.g., from an object) and/or by reading the representation from a storage device. In some embodiments, the extent to which a support structure supports an object is determined, at least in part, by accessing a representation of the support structure stored on one or more computer readable media, which may be located in any suitable location or locations.

A determination of supportedness may be made based on the representation of the support structure in addition to any suitable information regarding an associated object. For example, the determination may be made based on representations of both the support structure and the object, but may also be based on a representation of the support structure in addition to information regarding the object. For example, only part of an object may be evaluated for supportedness, and accordingly a complete representation of the object may not be necessary in making said evaluation.

Figure 11:
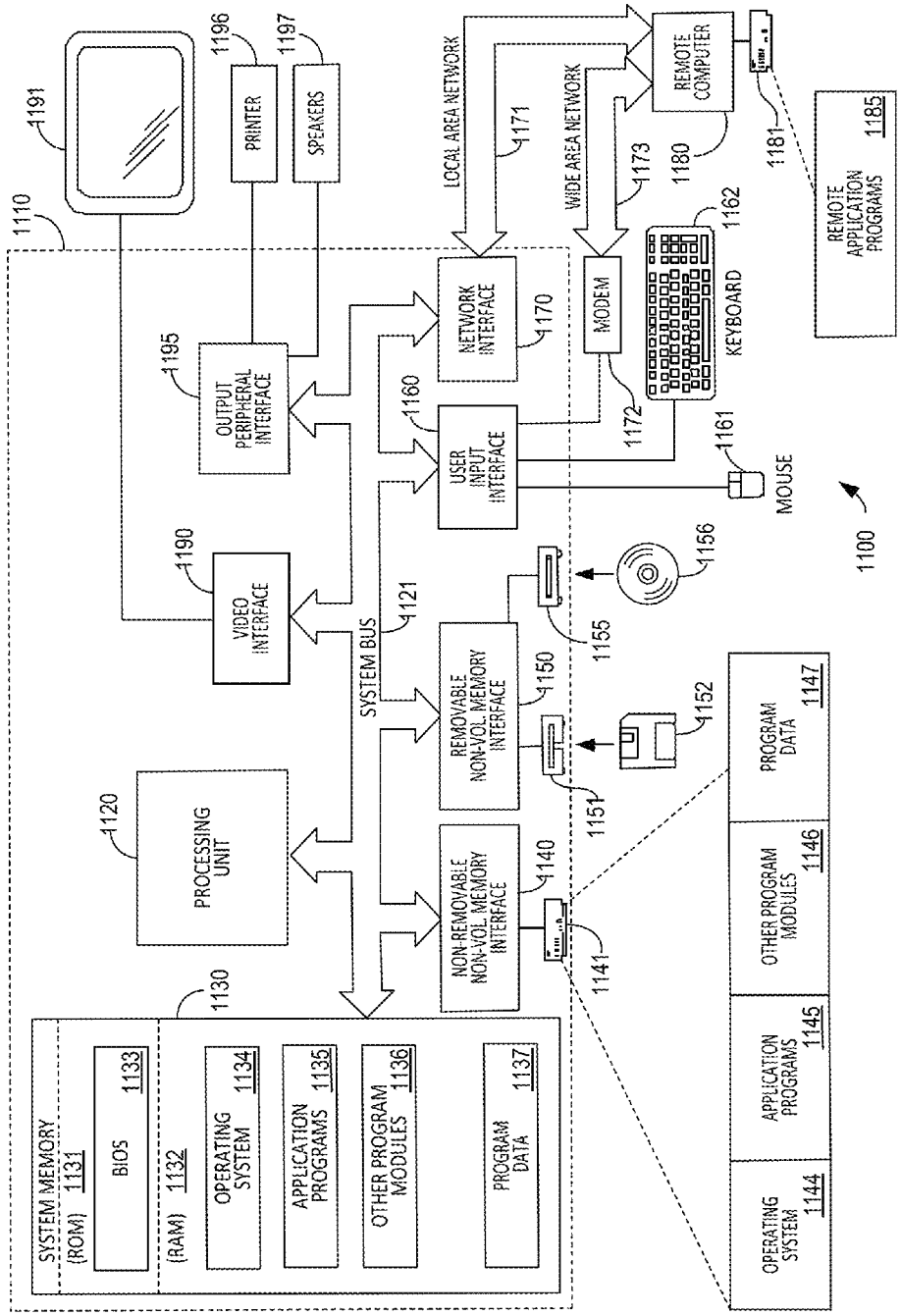
FIG. 11 illustrates an example of a computing system environment on which aspects of the invention may be implemented.

FIG. 11 illustrates an example of a suitable computing system environment 1100 on which aspects of the invention may be implemented. For example, the computing system environment 1100 may be used to determine the supportedness of one or more regions of an object, to generate a support structure for an object, to generate support tips for a support structure, to indicate the supportedness of one or more regions of an object via a graphical user interface, to interface with one or more devices to effect additive fabrication of an object and/or a support structure, or any combinations thereof. Such a computing environment may represent a home computer, a tablet, a mobile device, a server and/or any another computing device.

The computing system environment 1100 is only one example of a suitable computing environment and is not intended to suggest any limitation as to the scope of use or functionality of the invention. Neither should the computing environment 1100 be interpreted as having any dependency or requirement relating to any one or combination of components illustrated in the exemplary operating environment 1100.

Aspects of the invention are operational with numerous other general purpose or special purpose computing system environments or configurations. Examples of well-known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The computing environment may execute computer-executable instructions, such as program modules. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 11, an exemplary system for implementing aspects of the invention includes a general purpose computing device in the form of a computer 1110. Components of computer 1110 may include, but are not limited to, a processing unit 1120, a system memory 1130, and a system bus 1121 that couples various system components including the system memory to the processing unit 1120. The system bus 1121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 1110 typically includes a variety of computer readable media. Computer readable media can be any available media that can be accessed by computer 1110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 1110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 1130 includes computer storage media in the form of volatile and/or nonvolatile memory such as read only memory (ROM) 1131 and random access memory (RAM) 1132. A basic input/output system 1133 (BIOS), containing the basic routines that help to transfer information between elements within computer 1110, such as during start-up, is typically stored in ROM 1131. RAM 1132 typically contains data and/or program modules that are immediately accessible to and/or presently being operated on by processing unit 1120. By way of example, and not limitation, FIG. 11 illustrates operating system 1134, application programs 1135, other program modules 1136, and program data 1137.

The computer 1110 may also include other removable/non-removable, volatile/nonvolatile computer storage media. By way of example only, FIG. 11 illustrates a hard disk drive 1141 that reads from or writes to non-removable, nonvolatile magnetic media, a magnetic disk drive 1151 that reads from or writes to a removable, nonvolatile magnetic disk 1152, and an optical disk drive 1155 that reads from or writes to a removable, nonvolatile optical disk 1156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 1141 is typically connected to the system bus 1121 through an non-removable memory interface such as interface 1140, and magnetic disk drive 1151 and optical disk drive 1155 are typically connected to the system bus 1121 by a removable memory interface, such as interface 1150.

The drives and their associated computer storage media discussed above and illustrated in FIG. 11, provide storage of computer readable instructions, data structures, program modules and other data for the computer 1110. In FIG. 11, for example, hard disk drive 1141 is illustrated as storing operating system 1144, application programs 1145, other program modules 1146, and program data 1147. Note that these components can either be the same as or different from operating system 1134, application programs 1135, other program modules 1136, and program data 1137. Operating system 1144, application programs 1145, other program modules 1146, and program data 1147 are given different numbers here to illustrate that, at a minimum, they are different copies. A user may enter commands and information into the computer 1110 through input devices such as a keyboard 1162 and pointing device 1161, commonly referred to as a mouse, trackball or touch pad. Other input devices (not shown) may include a microphone, joystick, game pad, satellite dish, scanner, or the like. These and other input devices are often connected to the processing unit 1120 through a user input interface 1160 that is coupled to the system bus, but may be connected by other interface and bus structures, such as a parallel port, game port or a universal serial bus (USB). A monitor 1191 or other type of display device is also connected to the system bus 1121 via an interface, such as a video interface 1190. In addition to the monitor, computers may also include other peripheral output devices such as speakers 1197 and printer 1196, which may be connected through a output peripheral interface 1195.

The computer 1110 may operate in a networked environment using logical connections to one or more remote computers, such as a remote computer 1180. The remote computer 1180 may be a personal computer, a server, a router, a network PC, a peer device or other common network node, and typically includes many or all of the elements described above relative to the computer 1110, although only a memory storage device 1181 has been illustrated in FIG. 11. The logical connections depicted in FIG. 11 include a local area network (LAN) 1171 and a wide area network (WAN) 1173, but may also include other networks. Such networking environments are commonplace in offices, enterprise-wide computer networks, intranets and the Internet.

When used in a LAN networking environment, the computer 1110 is connected to the LAN 1171 through a network interface or adapter 1170. When used in a WAN networking environment, the computer 1110 typically includes a modem 1172 or other means for establishing communications over the WAN 1173, such as the Internet. The modem 1172, which may be internal or external, may be connected to the system bus 1121 via the user input interface 1160, or other appropriate mechanism. In a networked environment, program modules depicted relative to the computer 1110, or portions thereof, may be stored in the remote memory storage device. By way of example, and not limitation, FIG. 11 illustrates remote application programs 1185 as residing on memory device 1181. It will be appreciated that the network connections shown are exemplary and other means of establishing a communications link between the computers may be used.

The various methods or processes outlined herein may be implemented in any suitable hardware. Additionally, the various methods or processes outlined herein may be implemented in a combination of hardware and of software executable on one or more processors that employ any one of a variety of operating systems or platforms. For example, the various methods or processes may utilize software to instruct a processor to determine the supportedness of one or more regions of an object to be fabricated via one or more additive fabrication techniques; and/or to generate a support structure, with or without support tips, for an object to be fabricated via one or more additive fabrication techniques. Example of such approaches are described above. However, any suitable combination of hardware and software may be employed to realize any of the embodiments discussed herein.

In this respect, various inventive concepts may be embodied as at least one non-transitory computer readable storage medium (e.g., a computer memory, one or more floppy discs, compact discs, optical discs, magnetic tapes, flash memories, circuit configurations in Field Programmable Gate Arrays or other semiconductor devices, etc.) encoded with one or more programs that, when executed on one or more computers or other processors, implement the various embodiments of the present invention. The non-transitory computer-readable medium or media may be transportable, such that the program or programs stored thereon may be loaded onto any computer resource to implement various aspects of the present invention as discussed above.

The terms "program" or "software" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present invention need not reside on a single computer or processor, but may be distributed in a modular fashion among different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Having herein described several embodiments, several advantages of embodiments of the present application should be apparent. One advantage is that embodiments may allow for an object fabricated via one or more additive fabrication techniques to be provided with mechanical support in the desired way while also minimizing the support structure's effect on the quality of the fabricated object.

Various inventive concepts may be embodied as one or more methods, of which examples have been provided. For example, methods of generating a support structure for an object, and methods of evaluating a support structure have been provided herein. The acts performed as part of any method described herein may be ordered in any suitable way. Accordingly, embodiments may be constructed in which acts are performed in an order different than illustrated, which may include performing some acts simultaneously, even though these acts may have been shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein, unless clearly indicated to the contrary, should be understood to mean "at least one."

As used herein, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

The phrase "and/or," as used herein, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of."

The phraseology and terminology used herein is for the purpose of description and should not be regarded as limiting. The use of "including," "comprising," "having," "containing", "involving", and variations thereof, is meant to encompass the items listed thereafter and additional items.

Having described several embodiments of the invention in detail, various modifications and improvements will readily occur to those skilled in the art.

For example, techniques of evaluating a support structure were described. These techniques may be applied in other contexts. For example, evaluation of any aspect of any structure used in additive fabrication may utilize techniques as described herein. Such modifications and improvements are intended to be within the spirit and scope of the invention. Accordingly, the foregoing description is by way of example only, and is not intended as limiting.

What is claimed is:

1. A method of generating a support structure for an object, the support structure and the object to be fabricated via one or more additive fabrication techniques, comprising:
    identifying one or more regions of the object as one or more regions to which mechanical support is to be provided;
    identifying one or more support points within at least a first region of the one or more regions;
    determining, for each of the one or more support points, a direction normal to the surface of the object; and
    generating the support structure for the object, the support structure comprising one or more support tips coupled to the object at the one or more support points,
    wherein an orientation of each of the support tips is determined based at least in part on the determined direction normal to the surface of the object at a respective support point,
    wherein the support structure comprises at least one scaffolding portion, and
    wherein at least a first support tip of the one or more support tips contacts the at least one scaffolding portion at a non-zero angle.

2. The method of claim 1, further comprising fabricating the support structure using the one or more additive fabrication techniques.

3. The method of claim 1, wherein at least a subset of the one or more support tips are oriented in the direction normal to the surface of the object at the respective support point.

4. The method of claim 1, wherein orientations of each of the one or more support tips are determined by applying an offset, based on directions of expected forces at the respective support point, to the direction normal to the surface of the object at the respective support point.

5. The method of claim 1, wherein at least a first support tip of the one or more support tips has a strength determined based at least in part on a degree to which the first region is self-supporting.

6. The method of claim 1, wherein the one or more support tips have geometries that depend, at least in part, upon a degree of support to avoid mechanical damage calculated based on directions of expected forces at respective support points.

7. The method of claim 6, wherein the geometries include an asymmetric cross-sectional area of contact with the object.

8. The method of claim 7, wherein at least a subset of the support tip geometries include a long axis and a short axis, and wherein the tips of the subset are positioned on the object such that the long axis of each tip is substantially perpendicular to a line extending from a centroid of the object.

9. The method of claim 7, wherein at least a subset of the support tip geometries include a long axis and a short axis, and wherein the tips of the subset are positioned on the object such that the long axis of each tip is substantially normal to a direction of a force predicted to be exerted on the object during fabrication thereof.

10. The method of claim 1, further comprising determining a plurality of layers that together correspond to a shape of the support structure.

11. The method of claim 1, wherein the support structure is formed in contact with a build platform, and wherein the at least one scaffolding portion contacts the build platform.

12. The method of claim 1, wherein the first support tip is mechanically weaker than the at least one scaffolding portion.

13. The method of claim 1, wherein a length of the first support tip is less than 10% of a length of the at least one scaffolding portion.

14. The method of claim 1, wherein the support structure comprises a plurality of scaffolding portions, and wherein each of the one or more support tips contacts a respective scaffolding portion of the plurality of scaffolding portions at a non-zero angle.

15. The method of claim 1, wherein the at least one scaffolding portion is generated using a minimum spanning tree.

16. The method of claim 1, wherein the support structure comprises a plurality of scaffolding portions, and wherein a majority of the one or more support tips contact a respective scaffolding portion at a non-zero angle.

17. The method of claim 16, wherein the majority of the one or more support tips contact a respective scaffolding portion at angles greater than 15 degrees.

18. The method of claim 16, wherein the majority of the one or more support tips contact a respective scaffolding portion at angles greater than 30 degrees.

19. The method of claim 1, wherein the non-zero angle is greater than 30 degrees.

20. The method of claim 1, wherein the non-zero angle is greater than 45 degrees.

21. The method of claim 1, wherein the non-zero angle is greater than 60 degrees.

22. The method of claim 1, wherein determining the direction normal to the surface of the object for at least a first support point of the one or more support points comprises:
    constructing a voxel representation of the object, the representation comprising a plurality of voxels;
    identifying a first voxel of the plurality of voxels as comprising the first support point; and
    calculating the direction normal to the surface of the object for the first support point by determining whether one or more voxels neighboring the first voxel are exterior to the object.

23. The method of claim 1, wherein determining the direction normal to the surface of the object for at least a first support point of the one or more support points comprises:
    accessing data describing a plurality of polygons that describe the object, the data comprising a normal direction for each of the plurality of polygons;
    identifying a first polygon of the plurality of polygons as comprising the first support point; and identifying the normal direction associated with the first polygon as the direction normal to the surface of the object for the first support point.

* * * * *